(12) United States Patent
Cohen et al.

(10) Patent No.: US 12,579,462 B1
(45) Date of Patent: Mar. 17, 2026

(54) CONTROLLING A QUANTUM PROCESSOR VIA QUANTUM PROGRAMMING FIELD PAYLOADS

(71) Applicant: Quantum Machines, Tel Aviv (IL)

(72) Inventors: Yonatan Cohen, Tel Aviv (IL); Nissim Ofek, Tel Aviv (IL); Itamar Sivan, Tel Aviv (IL); Ori Weber, Tel Aviv (IL)

(73) Assignee: Q.M Technologies Ltd. (IL)

( * ) Notice: Subject to any disclaimer, the term of this patent is extended or adjusted under 35 U.S.C. 154(b) by 1589 days.

(21) Appl. No.: 16/994,017

(22) Filed: Aug. 14, 2020

Related U.S. Application Data

(60) Provisional application No. 62/886,514, filed on Aug. 14, 2019.

(51) Int. Cl.
G06N 10/80 (2022.01)
G06N 10/40 (2022.01)

(52) U.S. Cl.
CPC ............. G06N 10/80 (2022.01); G06N 10/40 (2022.01)

(58) Field of Classification Search
CPC ......... G06N 10/00; G06N 10/40; G06N 10/80
See application file for complete search history.

(56) References Cited

U.S. PATENT DOCUMENTS

| | | | |
|---|---|---|---|
| 4,875,484 A | 10/1989 | Anzai et al. | |
| 6,993,108 B1 | 1/2006 | Chi et al. | |
| 7,451,292 B2 | 11/2008 | Routt | |
| 7,627,126 B1 | 12/2009 | Pikalo | |
| 8,315,969 B2 | 11/2012 | Roetteler | |
| 8,385,878 B2 | 2/2013 | Rao | |
| 8,750,717 B1 | 6/2014 | Yap et al. | |
| 9,207,672 B2 | 12/2015 | Williams | |
| 9,400,499 B2 | 7/2016 | Williams | |
| 9,509,324 B2 | 11/2016 | McDonald et al. | |
| 9,663,358 B1 * | 5/2017 | Cory ........................ | G06F 7/38 |
| 9,692,423 B2 | 6/2017 | McDermott, III | |
| 9,847,121 B2 | 12/2017 | Frank | |
| 9,858,531 B1 | 1/2018 | Monroe | |
| 9,892,365 B2 | 2/2018 | Rigetti | |
| 9,978,020 B1 | 5/2018 | Gambetta | |

(Continued)

FOREIGN PATENT DOCUMENTS

| | | |
|---|---|---|
| CN | 105281886 | 1/2016 |
| CN | 105912070 A | 8/2016 |

(Continued)

OTHER PUBLICATIONS

Cross et al., "Open Quantum Assembly Language," Jul. 13, 2017, retrieved from https://arxiv.org/abs/1707.03429v2, 24 pgs. (Year: 2017).*

(Continued)

*Primary Examiner* — Eric J. Bycer
(74) *Attorney, Agent, or Firm* — McAndrews, Held & Malloy, Ltd.

(57) ABSTRACT

A system comprises pulse instruction memory and pulse generation circuitry, wherein the pulse generation circuitry is operable to retrieve a pulse instruction from the pulse instruction memory, and concurrently generate one or more analog pulses based on a first one or more fields present in the pulse instruction, and one or more digital pulses based on a second one or more fields present in the pulse instruction.

36 Claims, 12 Drawing Sheets

(56) References Cited

U.S. PATENT DOCUMENTS

| | | | |
|---|---|---|---|
| 9,979,400 B1 | 5/2018 | Sete | |
| 9,996,801 B2 | 6/2018 | Shim | |
| 10,063,228 B2 | 8/2018 | Deurloo et al. | |
| 10,122,351 B1 | 11/2018 | Naaman | |
| 10,127,499 B1 | 11/2018 | Rigetti | |
| 10,192,168 B2 | 1/2019 | Rigetti | |
| 10,223,643 B1 | 3/2019 | Bishop et al. | |
| 10,333,503 B1 | 6/2019 | Cohen et al. | |
| 10,454,459 B1 | 10/2019 | Cohen | |
| 10,496,069 B2 | 12/2019 | Nazarathy et al. | |
| 10,505,524 B1 | 12/2019 | Cohen | |
| 10,560,076 B1 | 2/2020 | Cohen | |
| 10,637,449 B1 | 4/2020 | Cohen et al. | |
| 10,659,018 B1 | 5/2020 | Cohen | |
| 10,666,238 B1 | 5/2020 | Cohen | |
| 10,958,253 B1 | 3/2021 | Cohen et al. | |
| 10,985,739 B2 | 4/2021 | Cohen et al. | |
| 11,010,145 B1 | 5/2021 | Smith et al. | |
| 2003/0121028 A1* | 6/2003 | Coury | B82Y 10/00 717/100 |
| 2004/0078421 A1* | 4/2004 | Routt | H04L 9/0852 709/201 |
| 2004/0266084 A1 | 12/2004 | Fujishima et al. | |
| 2005/0180575 A1 | 8/2005 | Maeda et al. | |
| 2006/0093376 A1 | 5/2006 | Mitchell et al. | |
| 2016/0125311 A1 | 5/2016 | Fuechsle et al. | |
| 2016/0267032 A1 | 9/2016 | Rigetti et al. | |
| 2016/0292586 A1 | 10/2016 | Rigetti et al. | |
| 2017/0076787 A1* | 3/2017 | Frank | G06N 10/00 |
| 2017/0214410 A1 | 7/2017 | Hincks et al. | |
| 2017/0364796 A1 | 12/2017 | Wiebe | |
| 2018/0003753 A1* | 1/2018 | Bishop | G06N 20/00 |
| 2018/0013426 A1 | 1/2018 | Deurloo et al. | |
| 2018/0032893 A1 | 2/2018 | Epstein | |
| 2018/0091244 A1 | 3/2018 | Abdo | |
| 2018/0123597 A1 | 5/2018 | Sete | |
| 2018/0260245 A1 | 9/2018 | Smith | |
| 2018/0260730 A1 | 9/2018 | Reagor | |
| 2018/0260732 A1 | 9/2018 | Bloom | |
| 2018/0308007 A1 | 10/2018 | Amin | |
| 2018/0322409 A1 | 11/2018 | Barends | |
| 2018/0365585 A1 | 12/2018 | Smith | |
| 2018/0373995 A1 | 12/2018 | Tomaru et al. | |
| 2018/0375650 A1 | 12/2018 | Legre | |
| 2019/0042964 A1 | 2/2019 | Elsherbini et al. | |
| 2019/0042965 A1 | 2/2019 | Clarke | |
| 2019/0042970 A1 | 2/2019 | Zou | |
| 2019/0042971 A1 | 2/2019 | Zou | |
| 2019/0042972 A1 | 2/2019 | Zou | |
| 2019/0042973 A1 | 2/2019 | Zou | |
| 2019/0049495 A1 | 2/2019 | Fek | |
| 2019/0251478 A1 | 8/2019 | Bishop et al. | |
| 2019/0385088 A1 | 12/2019 | Naaman et al. | |
| 2020/0364602 A1 | 11/2020 | Niu et al. | |
| 2021/0004707 A1 | 1/2021 | Gambetta et al. | |
| 2021/0103847 A1 | 4/2021 | Akzam | |
| 2021/0182722 A1* | 6/2021 | Kong | G01R 31/28 |

FOREIGN PATENT DOCUMENTS

| | | |
|---|---|---|
| CN | 108111306 A | 6/2018 |
| CN | 110085094 A | 8/2019 |
| CN | 111464154 | 7/2020 |
| CN | 111767055 | 10/2020 |
| CN | 112019193 | 12/2020 |
| CN | 112149832 A | 12/2020 |
| JP | 2011175078 | 9/2011 |
| WO | 2015178991 | 11/2015 |
| WO | 2015178992 | 11/2015 |
| WO | 2017078735 | 5/2017 |
| WO | 2017139683 A1 | 8/2017 |
| WO | 2018062991 A1 | 4/2018 |
| WO | 2019063117 | 4/2019 |
| WO | 2020033807 | 2/2020 |
| WO | 2020231795 A1 | 11/2020 |

OTHER PUBLICATIONS

Divincenzo, David P., "The Physical Implementation of Quantum Computation," arXiv:quant-ph/0002077v3, Dec. 12, 2001, 9 pgs. (Year: 2001).*

Li et al., Optimal pulse design in quantum control: A unified computational method, PNAS, vol. 108, No. 5, Feb. 1, 2011, pp. 1879-1884. (Year: 2011).*

Fu et al., "An Experimental Microarchitecture for a Superconducting Quantum Processor," MICRO-50, Oct. 14-18, 2017, pp. 813-825. (Year: 2017).*

McCaskey et al., "A Language and Hardware Independent Approach to Quantum-Classical Computing," arXiv:1701.01794v2, Aug. 1, 2018, 15 pgs. (Year: 2018).*

Fu et al., "eQASM: An Executable Quantum Instruction Set Architecture," 2019 IEEE International Symposium on High Performance Computer Architecture, Mar. 28, 2019, pp. 224-237. (Year: 2019).*

Shi et al., "Optimized Compilation of Aggregated Instructions for Realistic Quantum Computers," ASPLOS 2019, Apr. 13-17, 2019, 14 pgs. (Year: 2019).*

Int'l Search Report and Written Opinion Appln No. PCT/IB2022/000059 mailed Jul. 7, 2022.

Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-8717-42bd-a077-c24b7281cd94 May 10, 2019 (May 10, 2019).

Int'l Preliminary Report on Patentability Appln No. PCT/IB2020/001004 mailed Jun. 30, 2022.

Int'l Search Report and Written Opinion Appln No. PCT/IB2022/000024 mailed Jul. 18, 2022.

Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).

Int'l Search Report and Written Opinion Appln No. PCT/IB2022/000068 mailed Jul. 17, 2022.

D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).

Int'l Search Report and Written Opinion Appln No. PCT/IB2020/000376 mailed Sep. 17, 2020.

Breitfelder et al. eds., IEEE 100: The Authoritative Dictionary of IEEE Standards Terms 1247, definition 2 of "variable" (7th ed. 2000). (Year: 2000).

Int'l Search Report and Written Opinion Appln No. PCT/IB2020/000707 mailed Jan. 12, 2021.

National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5.

IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/ pdf/1809.03452.pdf.

Int'l Search Report and Written Opinion Appln No. PCT/IB2020/000704 mailed Jan. 17, 2021.

Int'l Search Report and Written Opinion Appln No. PCT/IB2020/000555 mailed Dec. 27, 2020.

Pulse Techniques for Quantum Information Processing University of Chicago, University College London Dec. 31, 2016.

Int'l Search Report and Written Opinion Appln No. PCT/IB2020/000760 mailed Jan. 27, 2021.

"Quantum-classical interface based on single flux quantum digital logic". In: Quantum Science and Technology 3.2 (2018), pp. 1-16.

(56) References Cited

OTHER PUBLICATIONS

DOI: 10.1088/2058-9565/aaa3a0.(retrieved on Jan. 20, 2021). Retrieved from the Internet: < https://arxiv.org/pdf/1710.04645.pdf.

Roffe, J., Quantum Error Correction: An Introductory Guide, Dept. of Physics & Astronomy, Univ. of Sheffeld, UK, Oct. 10, 2019, pp. 1-29.

Int'l Search Report and Written Opinion Appln No. PCT/IB2020/001004 mailed May 13, 2021.

Int'l Preliminary Report on Patentability Appln No. PCT/IB2019/001410 mailed Jun. 10, 2021.

Int'l Search Report and Written Opinion Appln No. PCT/IB2021/000067 mailed Jun. 21, 2021.

Int'l Preliminary Report on Patentability Appln No. PCT/IB2019/001394 mailed Jul. 29, 2021.

Int'l Preliminary Report on Patentability Appln No. PCT/IB2020/000218 mailed Sep. 16, 2021.

Int'l Preliminary Report on Patentability Appln No. PCT/IB2020/000376 mailed Nov. 12, 2021.

Int'l Search Report and Written Opinion Appln No. PCT/IB2021/056254 mailed Dec. 1, 2021.

Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).

Int'l Preliminary Report on Patentability Appln No. PCT/IB2020/000555 mailed Feb. 10, 2022.

Int'l Preliminary Report on Patentability Appln No. PCT/IB2020/000707 mailed Mar. 17, 2022.

Int'l Preliminary Report on Patentability Appln No. PCT/IB2020/000704 mailed Mar. 17, 2022.

Int'l Preliminary Report on Patentability Appln No. PCT/IB2020/000760 mailed Apr. 7, 2022.

Int'l Search Report and Written Opinion Appln No. PCT/IB2022/050190 mailed Apr. 11, 2022.

U.S. Appl. No. 62/294,966, filed Feb. 12, 2016.

Int'l Search Report and Written Opinion Appln No. PCT/IB2019/001410 mailed Jun. 10, 2020.

Int'l Search Report and Written Opinion Appln No. PCT/IB2019/001394 mailed Jun. 17, 2020.

Zhang J, Hegde SS, Suter D. Pulse sequences for controlled 2-and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Search Report and Written Opinion Appln No. PCT/IB2020/000218 mailed Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).

* cited by examiner

Ctrl
502

IF$_0$

○ ○ ○

IF$_{L-1}$ phase generation
604 clk1   TS $\theta_0 = 2\pi f_0 TS \cdot dt_{clk1}$ $\theta_{K-1} = 2\pi f_{K-1} TS \cdot dt_{clk1}$ Time stamp
Register
605 clk1

TS

CORDIC
602$_0$

○ ○ ○

CORDIC
602$_{K-1}$ cos($\theta_0$)  603C$_0$ sin($\theta_0$)  603S$_0$ cos($\theta_{P-1}$)

sin($\theta_{K-1}$)

S Matrix generation
608 clk1

S$_0$

○ ○ ○

S$_{K-1}$

503

CONTROLLING A QUANTUM PROCESSOR VIA QUANTUM PROGRAMMING FIELD PAYLOADS

PRIORITY CLAIM

This application claims the benefit of priority to U.S. Provisional Application 62/886,514 filed Aug. 14, 2019, the entirety of which is hereby incorporated herein by reference.

BACKGROUND

Limitations and disadvantages of conventional approaches to quantum computer control systems will become apparent to one of skill in the art, through comparison of such approaches with some aspects of the present method and system set forth in the remainder of this disclosure with reference to the drawings.

BRIEF SUMMARY

Methods and systems are provided for a quantum controller, substantially as illustrated by and/or described in connection with at least one of the figures, as set forth more completely in the claims.

DETAILED DESCRIPTION

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Figure 1A:
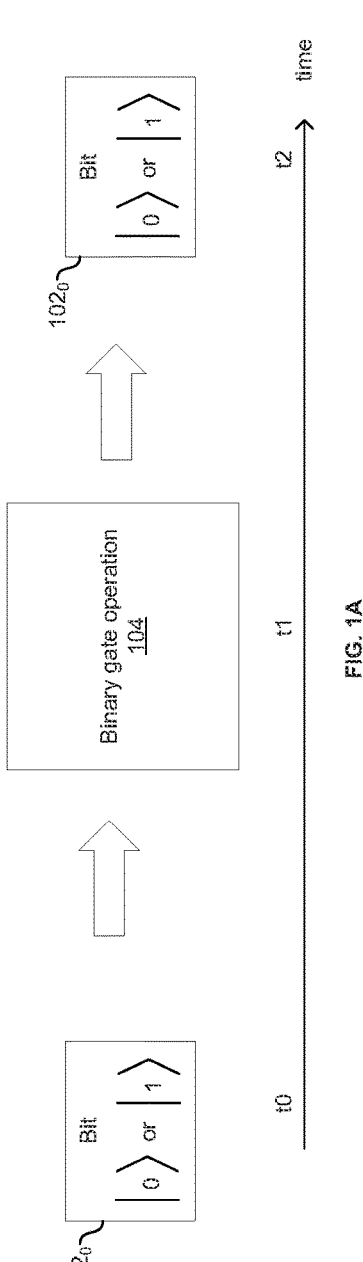
FIGS. 1A and 1B compare some aspects of classical (binary) computing and quantum computing.

Shown in FIG. 1A is a simple example of a classical computer configured to a bit 102 and apply a single logic operation 104 to the bit 102. At time to the bit 102 is in a first state, at time t1 the logic operation 104 is applied to the bit 102, and at time t2 the bit 102 is in a second state determined by the state at time t0 and the logic operation. So, for example, the bit 102 may typically be stored as a voltage (e.g., 1 Vdc for a "1" or 0 Vdc for a "0") which is applied to an input of the logic operation 104 (comprised of one or more transistors). The output of the logic gate is then either 1Vdc or 0Vdc, depending on the logic operation performed.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time, More precisely, a quantum bit is a system whose state lives in a two dimensional Hilbert space and is therefore described as a linear combination $\alpha|0\rangle + 8|1\rangle$, where $|0\rangle$ and $|1\rangle$ are two basis states, and a and B are complex numbers, usually called probability amplitudes, which satisfy $|\alpha| + [\beta]^2 = 1$. Using this notation, when the qubit is measured, it will be 0 with probability $|a|^2$ and will be 1 with probability $|\beta|^2$. $[0\rangle$ and $|1\rangle$ can also be represented by two-dimensional basis vectors $$\begin{bmatrix} 1 \\ 0 \end{bmatrix} \text{ and } \begin{bmatrix} 0 \\ 1 \end{bmatrix},$$

respectively, and then the qubit state is represented by $$\begin{bmatrix} \alpha \\ \beta \end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers (in fact some problems that are intractable for classical computers may become trivial for quantum computers).

Figure 1B:
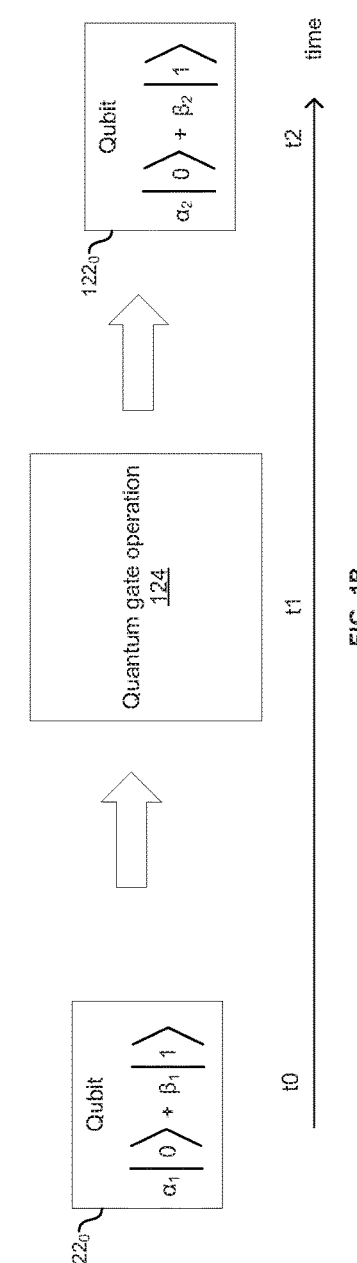

Shown in FIG. 1B is a simple example of a quantum computer configured to store a qubit 122 and apply a single quantum gate operation 124 to the qubit 122. At time t0 the qubit 122 is described by $\alpha_1|0\rangle + \beta_1|1\rangle$, at time t1 the logic operation 124 is applied to the qubit 122, and at time t2 the qubits 122 is described by $\alpha_2|0\rangle + \beta_2|1\rangle$.

Unlike a classical bit, a qubit cannot be stored as a single voltage value on a wire. Instead, a qubit is physically realized using a two-level quantum mechanical system. Many physical implementations of qubits have been proposed and developed over the years with some being more promising than others. Some examples of leading qubits implementations include superconducting circuits, spin qubits, and trapped ions.

It is the job of the quantum controller to generate the precise series of external signals, usually pulses of electromagnetic waves and pulses of base band voltage, to perform the desired logic operations (and thus carry out the desired quantum algorithm). Example implementations of a quantum controller are described in further detail below.

Figure 2:
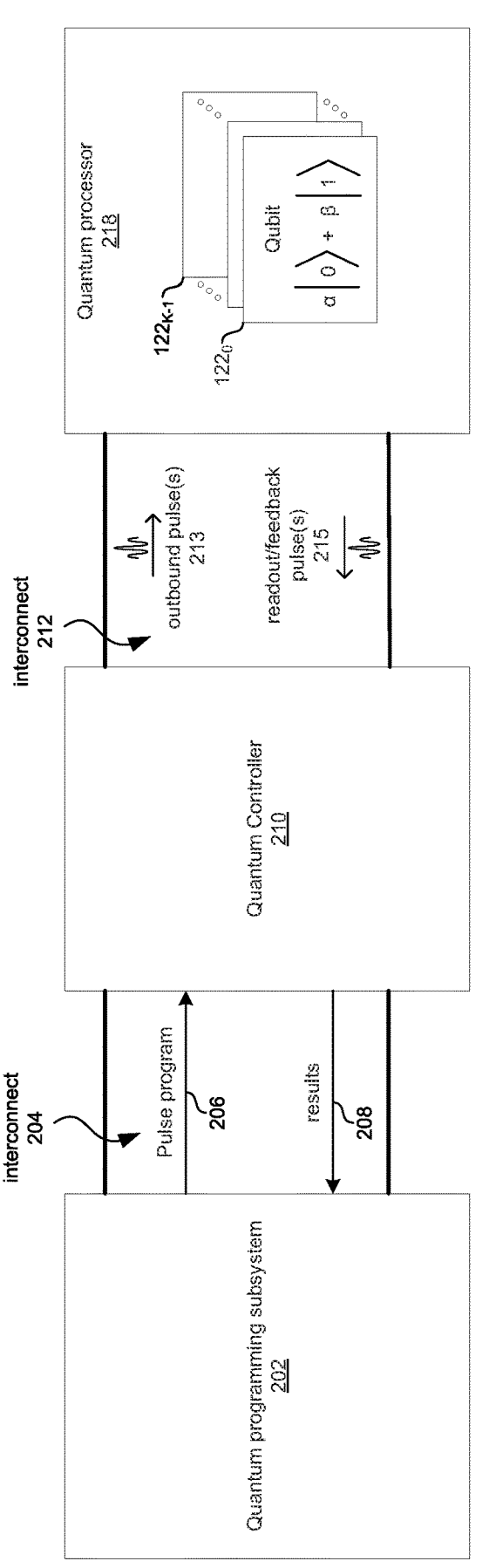
FIG. 2 shows an example quantum computing system.

FIG. 2 shows an example quantum computing system. The system comprises a quantum programming subsystem 202, a quantum controller 210, and a quantum processor 218.

The quantum programming subsystem 202 comprises circuitry operable to generate a quantum algorithm description 206 (i.e., "pulse program description") which configures the quantum controller 210 and which the quantum controller 210 can execute to carry out a quantum algorithm on the quantum processor 218 (i.e., generate the necessary outbound quantum pulse(s) 213) with little or no human intervention during runtime of the pulse program. In an example implementation, the quantum programming subsystem 202 is a personal computer having installed on it a quantum controller software development kit (SDK) that enables creation (e.g., by a user via a text editor, integrated development environment (IDE), and/or by automated pulse program description generation circuitry) of a high-level (as opposed to binary or "machine code") pulse program description 206. In an example implementation, the programming language may be a low-level language which has little or no abstraction from the instruction set used by the specific hardware of the quantum controller 210. Such instructions may be converted to machine code of the quantum controller 210 without need of a compiler or interpreter. In an example implementation, the programming language may be a high-level language which is much more abstracted from the particular hardware of the quantum controller 210. Such instructions may be compiled into machine code before they can be run on the quantum controller 210. In an example implementation the description 206 may be a machine code description of the quantum algorithm. In an example implementation, the description 206 may be a high-level description which the quantum controller 210 may itself compile into machine code. In an example implementation, the description 206 may be a high-level description which the quantum controller 210 may interpret into machine code during runtime. In an example implementation, an operating system or other software layer may run on the quantum controller 210 and the pulse program description 206 may be software instructions that make use of an application programming interface (API) of the software running on the quantum controller 210.

The high-level pulse program description 206 may comprise a specification and a program. Although the specification and program may be part of one or more larger databases and/or contained in one or more files, and one or more formats, the remainder of this disclosure will, for simplicity of description, assume the configuration data structure and the program data structure each takes the form of a plain-text file recognizable by an operating system (e.g., MICROSOFT WINDOWS, LINUX, MACINTOSH, or another OS) on which programming subsystem 202 runs. The programming subsystem 202 then compiles the high-level pulse program description 206 to a machine code version of the pulse program description 206 (i.e., series of binary vectors that represent instructions that the hardware of the pulse controller 260 can interpret and execute directly).

The quantum programming subsystem 202 is coupled to the quantum controller 210 via interconnect 204 which may, for example, utilize universal serial bus (USB), peripheral component interconnect (PCIe) bus, wired or wireless Ethernet, or any other suitable communication protocol.

The quantum controller 210 comprises circuitry operable to load the pulse program description 206 and then perform the quantum algorithm as per the pulse program description 206. In an example implementation, pulse program description 206 is machine code (i.e., series of binary vectors that represent instructions that the quantum controller's hardware can interpret and execute directly) which is loaded into the quantum controller 210. Then, execution of the machine code by the quantum controller 210 causes the quantum controller 210 to generate the necessary outbound quantum control pulse(s) 213 that correspond to the desired operations to be performed on the quantum processor 218 (e.g., sent to qubit(s) for manipulating a state of the qubit(s) or to readout resonator(s) for reading the state of the qubit(s), etc.). Depending on the quantum algorithm to be performed, outbound pulse(s) 213 for carrying out the algorithm may be predetermined at design time and/or may need to be determined during runtime. The runtime determination of the pulses may comprise performance of classical calculations and processing in the quantum controller 210 and/or the quantum programing subsystem 202 during runtime of the algorithm (e.g., runtime analysis of inbound pulses 215 received from the quantum processor 218).

During runtime and/or upon completion of a quantum algorithm and/or during runtime of a quantum algorithm performed by the quantum controller 210, the quantum controller 210 may output data/results 208 to the quantum programming subsystem 202. In an example implementation these results may be used to generate a new pulse program description 206 for a subsequent run of the quantum algorithm and/or update the pulse program during runtime.

The quantum controller 210 is coupled to the quantum processor 218 via interconnect 212 which may comprise, for example, one or more conductors and/or optical fibers.

The quantum processor 218 comprises K (an integer) quantum elements 122, which includes qubits (which could be of any type such as superconducting, spin qubits, ion trapped, etc.), and, where applicable, any other element(s) for processing quantum information, storing quantum information (e.g. storage resonator), and/or coupling the outbound quantum control pulses 213 and inbound quantum control pulses 215 between interconnect 212 and the quantum element(s) 122 (e.g., readout resonator(s)). In an example implementation in which the quantum processor comprises readout resonators (or other readout circuitry), K may be equal to the total number of qubits plus the number of readout circuits. That is, if each of Q (an integer) qubits of the quantum processor 218 is associated with a dedicated readout circuit, then K may be equal to 20. For ease of description, the remainder of this disclosure will assume such an implementation, but it need not be the case in all implementations. Other elements of the quantum processor 218 may include, for example, flux lines (electronic lines for carrying current), gate electrodes (electrodes for voltage gating), current/voltage lines, amplifiers, classical logic circuits residing on-chip in the quantum processor 218, and/or the like.

Figure 3A:
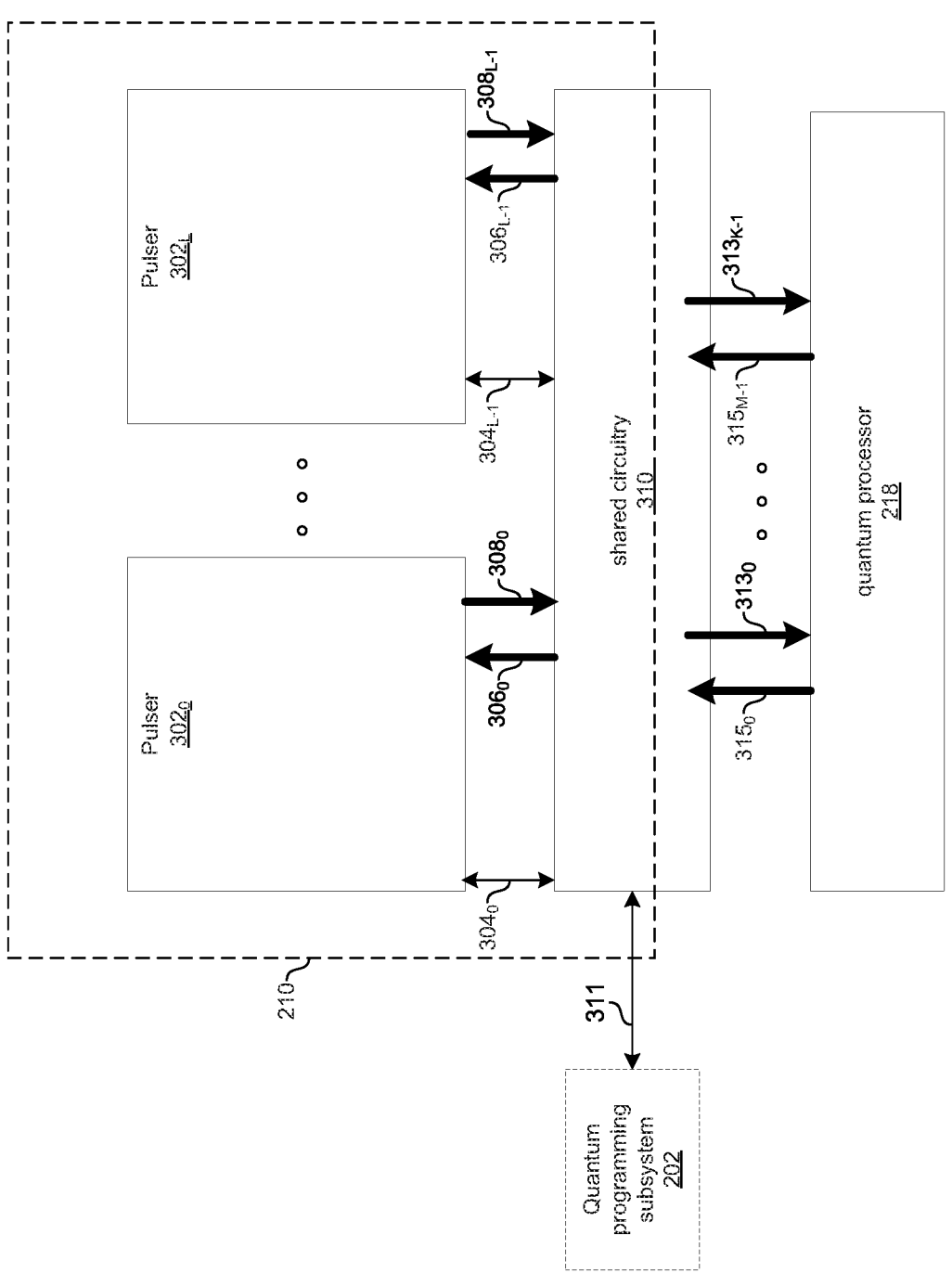
FIG. 3A shows an example quantum controller architecture in accordance with various example implementations of this disclosure.

FIG. 3A shows an example quantum controller architecture in accordance with various example implementations of this disclosure. The quantum controller 210 comprises L (an integer $\geq 1$) pulser circuits $302_0$-$302_{L-1}$ and shared circuitry 310.

In the example implementation shown, each pulser circuit 302: (I an integer between 0 and L-1) comprises circuitry for exchanging information over signal paths 3041, 3064, and 3081, where the signal path 308I carries outbound pulses (e.g., 213 of FIG. 2) generated by the pulser circuit 302: (which may be, for example, control pulses sent to the quantum processor 218 to manipulate one or more properties of one or more quantum elements—e.g., manipulate a state of one or more qubits, manipulate a frequency of a qubit using flux biasing, etc., and/or readout a state of one or more quantum elements), the signal path 306I carries inbound quantum element readout pulses (e.g., 215 of FIG. 2) to be processed by the pulser circuit 3021, and signal path 304; carries control information. Each signal path may comprise one or more conductors, optical channels, and/or wireless channels.

Each pulser circuit 302I comprises circuitry operable to generate outbound pulses on signal path 308; according to quantum control operations to be performed on the quantum processor 218. This involves very precisely controlling characteristics such as phase, frequency, amplitude, and timing of the outbound pulses. The characteristics of an outbound pulse generated at any particular time may be determined, at least in part, on inbound pulses received from the quantum processor 218 (via shared circuitry 310 and signal path 306;) at a prior time. In an example implementation, the time required to close the feedback loop (i.e., time from receiving a first pulse on one or more of paths $315_1$-$315_L$ (e.g., at an analog to digital converter of the path) to sending a second pulse on one or more of paths $313_0$-$313_{L-1}$ (e.g., at an output of a digital-to-analog converter of the path), where the second pulse is based on the first pulse, is significantly less than the coherence time of the qubits of the quantum processor 218. For example, the time to close the feedback loop may be on the order of 100 nanoseconds. It should be noted that each signal path in FIG. 3A may in practice be a set of signal paths for supporting generation of multi-pulse sets (e.g., two signal paths for two-pulse pairs, three signal paths for three-pulse sets, and so on).

In the example implementation shown, the shared circuitry 310 comprises circuitry for exchanging information with the pulser circuits 3020-302L-1 over signal paths $304_0$-$304_{L-1}$, $306_0$-$306_{L-1}$, and $308_0$-$308_{L-1}$, where each signal path 308I carries outbound pulses generated by the pulser circuit 3021, each signal path 306; carries inbound pulses to be processed by pulser circuit $302_I$, and each signal path 304; carries control information such as flag/status signals, data read from memory, data to be stored in memory, data streamed to/from the quantum programming subsystem 202, and data to be exchanged between two or more pulsers $302_0$-$302_L$. Similarly, in the example shown the shared circuitry 310 comprises circuitry for exchanging information with the quantum processor 218 over signal paths 3150-315M-1 and $313_1$-$313_{K-1}$, where each signal path $315_m$ (m an integer between 0 and M-1) carries inbound pulses from the quantum processor 218, and each signal path $313_k$ (k an integer between 0 and K-1) carries outbound pulses to the quantum processor 218. Additionally, in the example shown the shared circuitry 310 comprises circuitry for exchanging information with the quantum programming subsystem over signal path 311. The shared circuitry 310 may be: integrated with the quantum controller (e.g., on the same field programmable gate array or application specific integrated circuitry or printed circuit board); external to the quantum controller (e.g., on a separate FPGA, ASIC, or PCB connected to the quantum controller via one or more cables, backplanes, in other devices connected to the quantum processor 218, etc.); or partially integrated with the quantum controller and partially external to the quantum controller.

In various implementations, M may be less than, equal to, or greater than L, K may be less than, equal to, or greater than L, and M may be less than, equal to, or greater than K. For example, the nature of some quantum algorithms is such that not all K quantum elements need to be driven at the same time. For such algorithms, L may be less than K and one or more of the L pulsers $302_I$ may be shared among multiple of the K quantum elements circuits. That is, any pulser $302_I$ may generate pulses for different quantum elements at different times. This ability of a pulser $302_I$ to generate pulses for different quantum elements at different times can reduce the number of pulsers $302_0$-$302_{L-1}$ (i.e., reduce L) required to support a given number of quantum elements (thus saving significant resources, cost, size, overhead when scaling to larger numbers of qubits, etc.).

The ability of a pulser 3021 to generate pulses for different quantum elements at different times also enables reduced latency. As just one example, assume a quantum algorithm which needs to send a pulse to quantum element $122_0$ at time T1, but whether the pulse is to be of a first type or second type (e.g., either an X pulse or a Hadamard pulse) cannot be determined until after processing an inbound readout pulse at time T1-DT (i.e., DT time intervals before the pulse is to be output). If there were a fixed assignment of pulsers $302_0$-$302_{L-1}$ to quantum elements of the quantum processor 218 (i.e., if $302_0$ could only send pulses to quantum element $122_0$, and $302_1$ could only send pulses to quantum element $122_1$, and so on), then pulser $302_0$ might not be able to start generating the pulse until it determined what the type was to be. In the depicted example implementation, on the other hand, pulser $302_0$ can start generating the first type pulse and pulser $302_1$ can start generating the second type pulse and then either of the two pulses can be released as soon as the necessary type is determined. Thus, if the time to generate the pulse is That, in this example the example quantum controller 210 may reduce latency of outputting the pulse by Tiat.

The shared circuitry 310 is thus operable to receive pulses via any one or more of the signals paths $308_0$-$308_{L-1}$ and/or $315_0$-$315_{M-1}$, process the received pulses as necessary for carrying out a quantum algorithm, and then output the resulting processed pulses via any one or more of the signal paths $306_0$-$306_{L-1}$ and/or $313_0$-$313_{K-1}$. The processing of the pulses may take place in the digital domain and/or the analog domain. The processing may comprise, for example: frequency translation/modulation, phase translation/modulation, frequency and/or time division multiplexing, time and/or frequency division demultiplexing, amplification, attenuation, filtering in the frequency domain and/or time domain, time-to-frequency-domain or frequency-to-time-domain conversion, upsampling, downsampling, and/or any other signal processing operation. At any given time, the decision as to from which signal path(s) to receive one or more pulse(s), and the decision as to onto which signal path(s) to output the pulse(s) may be: predetermined (at least in part) in the pulse program description; and/or dynamically determined (at least in part) during runtime of the quantum algorithm based on classical programs/computations performed during runtime, which may involve processing of inbound pulses. As an example of predetermined pulse generation and routing, a pulse program description may simply specify that a particular pulse with predetermined characteristics is to be sent to signal path $3131$ at a predetermined time. As an example of dynamic pulse determination and routing, a pulse program description may specify that an inbound readout pulse at time T-DT should be analyzed and its characteristics (e.g., phase, frequency, and/ or amplitude) used to determine, for example, whether at time T pulser $302$: should output a pulse to a first quantum element or to a second quantum element or to determine, for example, whether at time T pulser $302$; should output a first pulse to a first quantum element or a second pulse to the first quantum element. In various implementations of the quantum controller $210$, the shared circuitry $310$ may perform various other functions instead of and/or in addition to those described above. In general, the shared circuitry $310$ may perform functions that are desired to be performed outside of the individual pulser circuits $302_0$-$302_{L-1}$. For example, a function may be desirable to implement in the shared circuitry $310$ where the same function is needed by a number of pulser circuits from $302_0$-$302_{L-1}$ and thus may be shared among these pulser circuits instead of redundantly being implemented inside each pulser circuit. As another example, a function may be desirable to implement in the shared circuitry $310$ where the function is not needed by all pulser circuits $302_0$-$302_{L-1}$ at the same time and/or on the same frequency and thus fewer than L circuits for implementing the function may be shared among the L pulser circuits $302_0$-$302_{L-1}$ through time and/or frequency division multiplexing. As another example, a function may be desirable to implement in the shared circuitry $310$ where the function involves making decisions based on inputs, outputs, and/or state of multiple of the L pulser circuits $302_0$-$302_{L-1}$, or other circuits. Utilizing a centralized coordinator/decision maker in the shared circuitry $310$ may have the benefit(s) of: (1) reducing pinout and complexity of the pulser circuits $302_0$-$302_{L-1}$; and/or (2) reducing decision-making latency. Nevertheless, in some implementations, decisions affecting multiple pulser circuits $302_0$-$302_{L-1}$ may be made by one or more of the pulser circuits $302_0$-$302_{L-1}$ where the information necessary for making the decision can be communicated among pulser circuits within a suitable time frame (e.g., still allowing the feedback loop to be closed within the qubit coherence time) over a tolerable number of pins/traces.

Figure 3B:
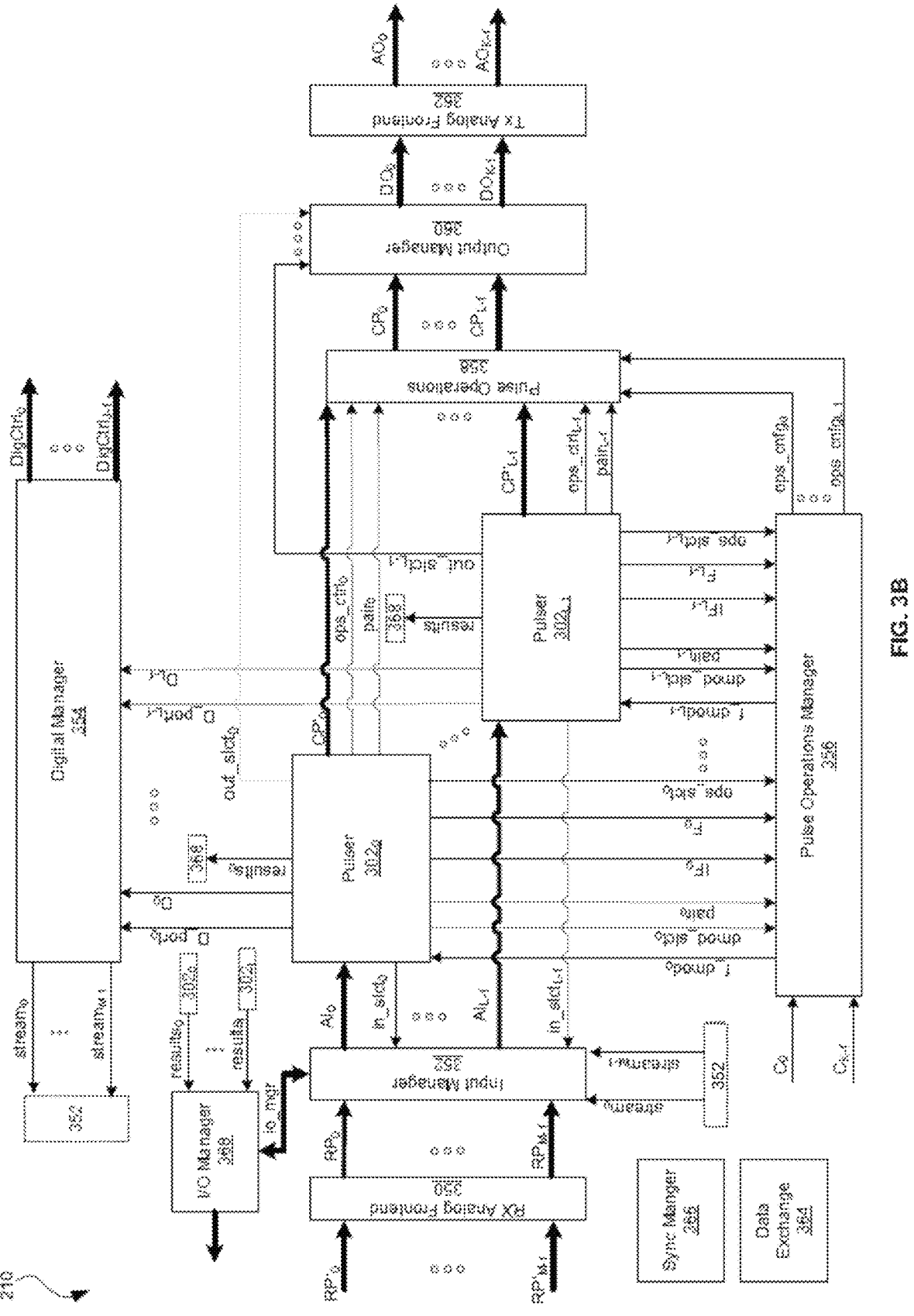
FIG. 3B shows an example implementation of the quantum controller circuitry of FIG. 3A.

FIG. 3B shows an example implementation of the quantum controller of FIG. 2. The example quantum controller shown comprises pulsers $302_1$-$302_{L-1}$, receive analog frontend $350$, input manager $352$, digital manager $354$, pulse operations manager $356$, pulse operations $358$, output manager $360$, transmit analog frontend $362$, data exchange $364$, synchronization manager $366$, and input/output ("I/O") manager $368$. Circuitry depicted in FIG. 3B other than pulser circuits $302_0$-$302_{L-1}$ corresponds to an example implementation of the shared circuitry $310$ of FIG. 3A.

The receive analog frontend $350$ comprises circuitry operable to concurrently process up to M (an integer $\geq 1$) analog inbound signals (RP'o-RP'M-1) received via signal paths $315_0$-$315_{M-1}$ to generate up to M concurrent inbound signals (RP'$_0$-RP'$_{M-1}$) to be output to input manager $352$ via one or more signal paths. Although there is shown to be M signals RP and M signals RP', this need not be the case. Such processing may comprise, for example, analog-to-digital conversion, filtering, upconversion, downconversion, amplification, attenuation, time division multiplexing/demultiplexing, frequency division multiplexing/demultiplexing, and/or the like. In various implementations, M may be less than, equal to, or greater than L and M may be less than, equal to, or greater than K.

The input manager $352$ comprises circuitry operable to route any one or more of signals (RP$_0$-RP$_{M-1}$) to any one or more of pulsers $302_0$-$302_{L-1}$ (as signal(s) Al$_0$-Al$_{L-1}$) and/or to other circuits (e.g. as signal io_mgr to I/O manager $368$). In an example implementation, the input manager $352$ comprises one or more switch networks, multiplexers, and/ or the like for dynamically reconfiguring which signals RP$_0$-RP$_{M-1}$ are routed to which pulsers $302_0$-$302_{L-1}$. This may enable time division multiplexing multiple of the signals RP$_0$-RP$_{M-1}$ onto a single signal Al$_l$ and/or time division demultiplexing components (e.g., time slices) of a signal RP$_m$ onto multiple of the signals Al$_0$-Al$_{L-1}$. In an example implementation, the input manager $352$ comprises one or more mixers and/or filters for frequency division multiplexing multiple of the signals RP$_0$-RP$_{M-1}$ onto a single signal All and/or frequency division demultiplexing components (e.g., frequency bands) of a signal RP$_m$ onto multiple of the signals Al$_0$-Al$_{L-1}$. The signal routing and multiplexing/demultiplexing functions performed by the input manager $352$ enables: a particular pulser $302$; to process different inbound pulses from different quantum elements at different times; a particular pulser $302$; to process different inbound pulses from different quantum elements at the same time; and multiple of the pulsers $302_0$-$302_{L-1}$ to processes the same inbound pulse at the same time. In the example implementation shown, routing of the signals RP$_0$-RP$_{M-1}$ among the inputs of the pulsers $302_0$-$302_{L-1}$ is controlled by digital control signals in_slct$_0$-in_slct$_{L-1}$ from the pulsers $302_0$-$302_{L-1}$. In another implementation, the input manager may be operable to autonomously determine the appropriate routing (e.g., where the pulse program description includes instructions to be loaded into memory of, and executed by, the input manager $352$). In the example implementation, the input manager $352$ is operable to rout input signals RP$_0$-RP$_{M-1}$ to the I/O manager $368$ (as signal(s) io_mgr), to be sent to the quantum programing subsystem $202$. This routing may, for example, be controlled by signals from the digital manager $354$. In an example implementation, for each input signal RP$_m$ there is a digital signal, stream$_m$, from the digital manager $354$ to the input manager $352$ that controls whether RP$_m$ will be sent from the input manager $352$ to the I/O manager $368$ and from there to the quantum programing subsystem $202$.

Each of the pulsers $302_0$-$302_{L-1}$ is as described above with reference to FIG. 3A. In the example implementation shown, each pulser $302$; is operable to generate raw outbound pulses CP' ("raw" is used simply to denote that the pulse has not yet been processed by pulse operations circuitry $358$) and digital control signals in_slt$_l$, D_port$_l$, D$_l$, out_sict$_l$, ops_ctrl$_l$, ops_sict$_l$, IF$_l$, F$_l$, and dmod_sclt$_l$ for carrying out quantum algorithms on the quantum processor $218$, and results$_l$ for carrying intermediate and/or final results generated by the pulser $302_l$ to the quantum programming subsystem $202$. One or more of the pulsers $302_0$-$302_{L-1}$ may receive and/or generate additional signals which are not shown in FIG. 3A for clarity of illustration. The raw outbound pulses CP'$_0$-CP'$_{L-1}$ are conveyed via signal paths $308_0$-$308_{L-1}$ and the digital control signals are conveyed via signal paths $304_0$-$304_{L-1}$. Each of the pulsers $302_l$ is operable to receive inbound pulse signal Al$_l$ and signal f_dmod$_l$. Pulser $302$ may process the inbound signal $AI_I$ to determine the state of certain quantum element(s) in the quantum processor 218 and use this state information for making decisions such as, for example, which raw outbound pulse CP' to generate next, when to generate it, and what control signals to generate to affect the characteristics of that raw outbound pulse appropriately. Pulser 302; may use the signal $f\_dmod_I$ for determining how to process inbound pulse signal AII. As an example, when pulser $302_1$ needs to process an inbound signal $AI_1$ from quantum element $122_3$, it can send a $dmod\_sclt_1$ signal that directs pulse operations manager 356 to send, on $f\_dmod_1$, settings to be used for demodulation of an inbound signal $AI_1$ from quantum element $122_3$ (e.g., the pulse operations manager 356 may send the value $\cos(\omega_3*TS*T_{clk1}+\phi_3)$, where $\omega 3$ is the frequency of quantum element $122_3$, TS is amount of time passed since the reference point, for instance the time at which quantum algorithm started running, and $\phi_3$ is the phase of the total frame rotation of quantum element $122_3$, i.e. the accumulated phase of all frame rotations since the reference point).

The pulse operations circuitry 358 is operable to process the raw outbound pulses $CP'_0$-$CP'_{L-1}$ to generate corresponding output outbound pulses $CP_0$-$CP_{L-1}$. This may comprise, for example, manipulating the amplitude, phase, and/or frequency of the raw pulse $CP'_I$. The pulse operations circuitry 358 receives raw outbound pulses $CP'_0$-$CP'_{L-1}$ from pulsers $302_0$-$302_{L-1}$, control signals $ops\_cnfg_0$-$ops\_cnfg_{L-1}$ from pulse operations manager 356, and $ops\_ctrl_0$-$ops\_ctrl_{L-1}$ from pulsers $302_0$-$302_{L-1}$.

The control signal $ops\_cnfg_I$ configures, at least in part, the pulse operations circuitry 358 such that each raw outbound pulse $CP'_I$ that passes through the pulse operations circuitry 358 has performed on it one or more operation(s) tailored for that particular pulse. To illustrate, denoting a raw outbound pulse from pulser $302_3$ at time T1 as $CP'_{3,T1}$, then, at time T1 (or sometime before T1 to allow for latency, circuit setup, etc.), the digital control signal $ops\_cnfg_3$ (denoted $ops\_cnfg_{3,T1}$ for purposes of this example) provides the information (e.g., in the form of one or more matrix, as described below) as to what specific operations are to be performed on pulse $CP'_{3,T1}$. Similarly, $ops\_cnfg_{4,T1}$ provides the information as to what specific operations are to be performed on pulse $CP'_{4,T1}$, and $ops\_cnfg_{3,T2}$ provides the information as to what specific operations are to be performed on pulse $CP'_{4,T1}$.

The control signal $ops\_ctrl_I$ provides another way for the pulser $302_I$ to configure how any particular pulse is processed in the pulse operations circuitry 358. This may enable the pulser $302_I$ to, for example, provide information to the pulse operation circuitry 358 that does not need to pass through the pulse operation manager 356. For example, the pulser $302_I$ may send matrix values calculated in real-time by the pulser 302; to be used by the pulse operation circuitry 358 to modify pulse $CP'_I$. These matrix values arrive to the pulse operation circuitry 358 directly from the pulser $302_I$ and do not need to be sent to the pulse operation manager first. Another example may be that the pulser $302_I$ provides information to the pulse operation circuitry 358 to affect the operations themselves (e.g. the signal $ops\_ctrl_I$ can choose among several different mathematical operations that can be performed on the pulse).

The pulse operations manager 356 comprises circuitry operable to configure the pulse operations circuitry 358 such that the pulse operations applied to each raw outbound pulse CPh are tailored to that particular raw outbound pulse. To illustrate, denoting a first raw outbound pulse to be output during a first time interval T1 as $CP'_{I,T1}$, and a second raw outbound pulse to be output during a second time interval T2 as $CP'_{I,T2}$, then pulse operations circuitry 358 is operable to perform a first one or more operations on $CP'_{I,T1}$ in and a second one or more operations on $CP'_{1,T2}$. The first one or more operations may be determined, at least in part, based on to which quantum element the pulse $CP_{1,T1}$ is to be sent, and the second one or more operations may be determined, at least in part, based on to which quantum element the pulse $CP_{1,T2}$ is to be sent. The determination of the first one or more operations and second one or more operations may be performed dynamically during runtime.

The transmit analog frontend 362 comprises circuitry operable to concurrently process up to K digital signals DOK to generate up to K concurrent analog signals AOk to be output to the quantum processor 218. Such processing may comprise, for example, digital-to-analog conversion, filtering, upconversion, downconversion, amplification, attenuation, time division multiplexing/demultiplexing, frequency division multiplexing/demultiplexing and/or the like. In an example implementation, each of the one or more of signal paths $313_0$-$313_{K-1}$ (FIG. 3A) represents a respective portion of Tx analog frontend circuit 362 as well as a respective portion of interconnect 212 (FIG. 2) between the Tx analog frontend circuit 362 and the quantum processor 218. Although there is one-to-one correspondence between the number of DO signals and the number of AO signals in the example implementation described here, such does not need to be the case. In another example implementation, the analog frontend 362 is operable to map more (or fewer) signals DO to fewer (or more) signals AO. In an example implementation the transmit analog frontend 362 is operable to process digital signals $DO_0$-$DO_{K-1}$ as K independent outbound pulses, as K/2 two-pulse pairs, or process some of signals $DO_0$-$DO_{K-1}$ as independent outbound pulses and some signals $DO_0$-$DO_{K-1}$ as two-pulse pairs (at different times and/or concurrently).

The output manager 360 comprises circuitry operable to route any one or more of signals $CP_0$-$CP_{L-1}$ to any one or more of signal paths $313_0$-$313_{K-1}$. As just one possible example, signal path $313_0$ may comprise a first path through the analog frontend 362 (e.g., a first mixer and DAC) that outputs $AO_0$ and traces/wires of interconnect 212 that carry signal $AO_0$; signal path $313_1$ may comprise a second path through the analog frontend 362 (e.g., a second mixer and DAC) that outputs $AO_1$ and traces/wires of interconnect 212 that carry signal $AO_1$, and so on. In an example implementation, the output manager 360 comprises one or more switch networks, multiplexers, and/or the like for dynamically reconfiguring which one or more signals $CP_0$-$CP_{L-1}$ are routed to which signal paths $313_0$-$313_{K-1}$. This may enable time division multiplexing multiple of the signals $CP_0$-$CP_{L-1}$ onto a single signal path $313_k$ and/or time division demultiplexing components (e.g., time slices) of a signal $CP_m$ onto multiple of the signal paths $313_0$-$313_{K-1}$. In an example implementation, the output manager 360 comprises one or more mixers and/or filters for frequency division multiplexing multiple of the signals $CP_0$-$CP_{M-1}$ onto a single signal path $313_k$ and/or frequency division demultiplexing components (e.g., frequency bands) of a signal $CP_m$ onto multiple of the signal paths $313_0$-$313_{K-1}$. The signal routing and multiplexing/demultiplexing functions performed by the output manager 360 enables: routing outbound pulses from a particular pulser 302; to different ones of the signal paths $313_0$-$313_{k-1}$ at different times; routing outbound pulses from a particular pulser 302; to multiple of the signal paths $313_0$-$313_{K-1}$ at the same time; and multiple of the pulsers $302_0$-$302_{L-1}$ generating pulses for the same signal path $313_k$ at the same time. In the example implementation shown, routing of the signals $CP_0$-$CP_{L-1}$ among the signal paths $313_0$-$313_{k-1}$ is controlled by digital control signals out_slct$_0$-out_slct$_{L-1}$from the pulsers $302_0$-$302_{L-1}$. In another implementation, the output manager 360 may be operable to autonomously determine the appropriate routing (e.g., where the pulse program description includes instructions to be loaded into memory of, and executed by, the output manager 360). In an example implementation, at any given time, the output manager 360 is operable to concurrently route K of the digital signals $CP_0$-$CP_{L-1}$ as K independent outbound pulses, concurrently route K/2 of the digital signals $CP_0$-$CP_{L-1}$ as two-pulse pairs, or route some of signals $CP_0$-$CP_{L-1}$ as independent outbound pulses and some others of the signals $CP_0$-$CP_{L-1}$ as multi-pulse sets (at different times and/or concurrently).

The digital manager 354 comprises circuitry operable to process and/or route digital control signals (DigCtrl$_0$-DigCtrl$_{J-1}$) to various circuits of the quantum controller 210 and/or external circuits coupled to the quantum controller 210. In the example implementation shown, the digital manager receives, from each pulser $302_J$, (e.g., via one or more of signal paths $304_0$-$304_{N-1}$) a digital signal D$_J$ that is to be processed and routed by the digital manager 354, and a control signal D_port$_J$ that indicates to which output port(s) of the digital manager 354 the signal D$_J$ should be routed. The digital control signals may be routed to, for example, any one or more of circuits shown in FIG. 3B, switches/gates which connect and disconnect the outputs $AO_0$-$AO_{K-1}$ from the quantum processor 218, external circuits coupled to the quantum controller 210 such as microwave mixers and amplifiers, and/or any other circuitry which can benefit from on real-time information from the pulser circuits $302_0$-$302_{L-1}$. Each such destination of the digital signals may require different operations to be performed on the digital signal (such as delay, broadening, or digital convolution with a given digital pattern). These operations may be performed by the digital manager 354 and may be specified by control signals from the pulsers $302_0$-$302_{L-1}$. This allows each pulser 302; to generate digital signals to different destinations and allows different ones of pulsers $302_0$-$302_{L-1}$ to generate digital signals to the same destination while saving resources.

The synchronization manager 366 comprises circuitry operable to manage synchronization of the various circuits shown in FIG. 3B. Such synchronization is advantageous in a modular and dynamic system, such as quantum controller 210, where different ones of pulsers $302_0$-$302_{L-1}$ generate, receive, and process pulses to and from different quantum elements at different times. For example, while carrying out a quantum algorithm, a first pulser circuit $302_1$ and a second pulser circuit $302_2$ may sometimes need to transmit pulses at precisely the same time and at other times transmit pulses independently of one another. In the example implementation shown, the synchronization manager 366 reduces the overhead involved in performing such synchronization.

The data exchange circuitry 364 is operable to manage exchange of data among the various circuits shown in FIG. 3B. For example, while carrying out a quantum algorithm, a first pulser circuit 302; and a second pulser circuit $302_2$ may sometimes need to exchange information. As just one example, pulser $302_1$ may need to share, with pulser $302_2$, the characteristics of an inbound signal Ah that it just processed so that pulser $302_2$ can generate a raw outbound pulse CP'2 based on the characteristics of $AI_1$. The data exchange circuitry 364 may enable such information exchange. In an example implementation, the data exchange circuitry 364 may comprise one or more registers to and from which the pulsers $302_0$-$302_{L-1}$ can read and write.

The I/O manager 368 is operable to route information between the quantum controller 210 and the quantum programming subsystem 202.

Figure 4:
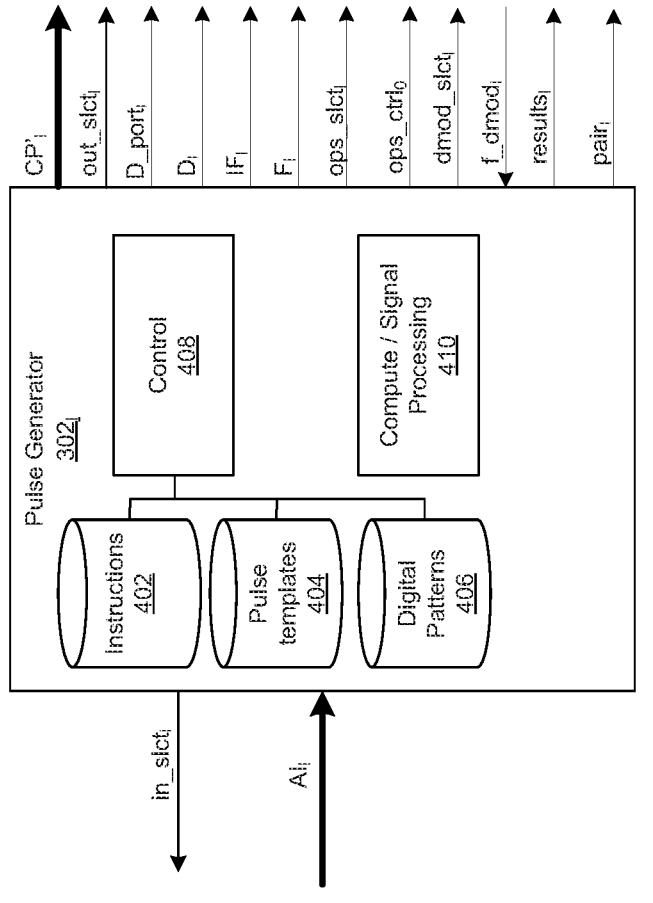
FIG. 4 shows an example implementation of the pulser of FIG. 3B.

FIG. 4 shows an example implementation of the pulser of FIG. 3B. The example pulser 302; shown comprises instruction memory 402, pulse template memory 404, digital pattern memory 406, control circuitry 408, and compute and/or signal processing circuitry (CSP) 410.

The memories 402, 404, 406 may comprise one or more be any type of suitable storage elements (e.g., DRAM, SRAM, Flash, etc.). The instructions stored in memory 402 are instructions to be executed out by the pulser $302_J$ for carrying out its role in a quantum algorithm. Because different pulsers $302_0$-$302_{L-1}$ have different roles to play in any particular quantum algorithm (e.g., generating different pulses at different times), the instructions memory 402 for each pulser 302: may be specific to that pulser. For example, the pulse program description 206 from the quantum programming subsystem 202 may comprise a first set of instructions to be loaded (via I/O manager 368) into pulser $302_0$, a second set of instructions to be loaded into pulser $302_1$, and so on. Each pulse template stored in memory 404 comprises a sequence of one or more samples of any arbitrary shape (e.g., Gaussian, sinc, impulse, etc.) representing the pulses to be sent to pulse operation circuitry 358. Each digital pattern stored in memory 406 comprises a sequence of one or more binary values which may represent the digital pulses to be sent to the digital manager 354 for generating digital control signals DigCtrl$_0$-DigCtrl$_{J-1}$.

The control circuitry 408 is operable to execute the instructions stored in memory 402 to process inbound signal $AI_J$, generate raw outbound pulses CP'$_J$, and generate digital control signals in_slct$_J$, out_slct$_J$, D_port$_J$, D$_J$, IF$_J$, F$_J$, ops_slct$_J$, ops_ctrl$_J$, results$_J$, dmod_slct$_J$ and pair$_J$. In the example implementation shown, the processing of the inbound signal AI1 is performed by the CSP circuitry 410 and based (at least in part) on the signal f_dmod$_J$.

The compute and/or signal processing circuitry (CSP) 410 is operable to perform computational and/or signal processing functions, which may comprise, for example Boolean-algebra based logic and arithmetic functions and demodulation (e.g., of inbound signals $AI_J$). The CSP 410 may comprise memory in which are stored instructions for performing the functions and demodulation. The instructions may be specific to a quantum algorithm to be performed and be generated during compilation of a quantum machine specification and programming, such as via a program written in the QUA language, as described below.

In operation of an example implementation, generation of a raw outbound pulse CPY comprises the control circuitry 408: ($_1$) determining a pulse template to retrieve from memory 404 (e.g., based on a result of computations and/or signal processing performed by the CSP 410); (2) retrieving the pulse template; (3) performing some preliminary processing on the pulse template; (4) determining the values of F, IF, pair$_J$, ops_slct$_J$, and dmod_slct$_J$ to be sent to the pulse operation manager 356 (as predetermined in the pulse program and/or determined dynamically based on results of computations and/or signal processing performed by the CSP 410); ($_5$) determining the value of ops_ctrl$_J$ to be sent to the pulse operation circuitry 358; (6) determining the value of in_slct$_J$ to be sent to the input manager 352; (7) determining a digital pattern to retrieve from memory 406 (as predetermined in the pulse program description and/or determined dynamically based on results of computations and/or signal processing performed by the CSP 410); (8) outputting the digital pattern as Di to the digital manager along with control signal D_port (as predetermined in the pulse program description and/or determined dynamically based on results of computations and/or signal processing performed by the CSP 410); (9) outputting the raw outbound pulse CP′ to the pulse operations circuitry 358; (10) outputting results$_f$ to the I/O manager.

Figure 5:
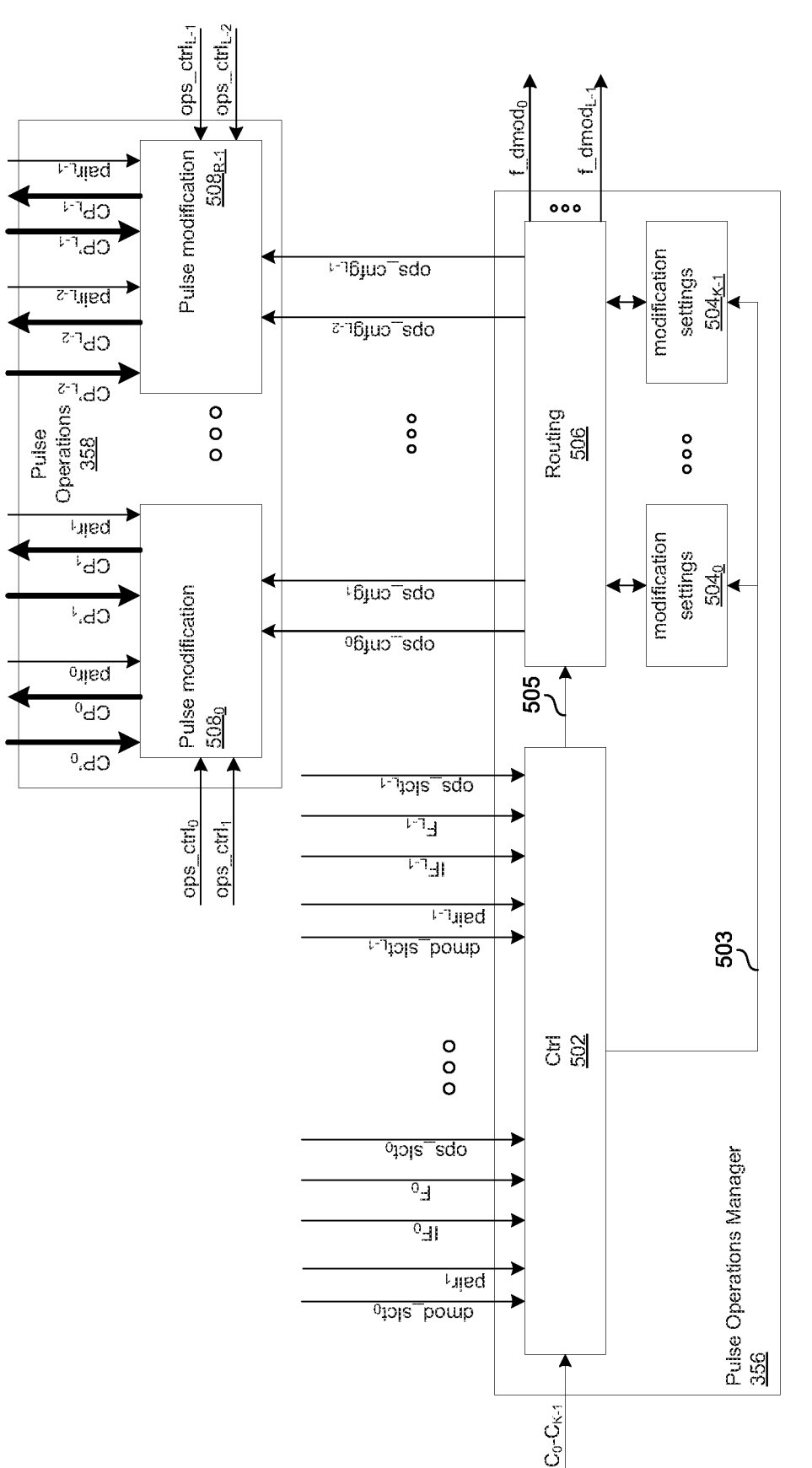
FIG. 5 shows an example implementation of the pulse operations manager and pulse operations circuitry of FIG. 3B.

FIG. 5 shows an example implementation of the pulse operations manager and pulse operations circuitry of FIG. 3B. The pulse operations circuitry 358 comprises a plurality of pulse modification circuits 508$_0$-508$_{R-1}$ (R is an integer ≥1 in general, and R=L/2 in the example shown). The pulse operations manager 356 comprises control circuitry 502, routing circuitry 506, and a plurality of modification settings circuits 504$_0$-504$_{K-1}$.

Although the example implementation has a 1-to-2 correspondence between pulse modification circuits 5080-508R-1 and pulser circuits 3020-302L-1, such does not need to be the case. In other implementations there may be fewer pulse modification circuits 508 than pulser circuits 302. Similarly, other implementations may comprise more pulse modification circuits 508 than pulser circuits 302.

As an example, in some instances, two of the pulsers 302$_0$-302$_{L-1}$ may generate two raw outbound pulses which are a phase-quadrature pulse pair. For example, assuming CP1 and CP2 are a phase-quadrature pulse pair to be output on path 313$_3$. In this example, pulse operations circuitry 358 may process CP$_1$ and CP$_2$ by multiplying a vector representation of CP′$_1$ and CP′$_2$ by one or more 2 by 2 matrices to: (1) perform single-sideband-modulation, as given by $$\begin{pmatrix} CP_1 \\ CP_2 \end{pmatrix} = \begin{pmatrix} \cos(\omega * TS * T_{clck1}) & -\sin(\omega * TS * T_{clck1}) \\ \sin(\omega * TS * T_{clck1}) & \cos(\omega * TS * T_{clck1}) \end{pmatrix} \begin{pmatrix} CP_1' \\ CP_2' \end{pmatrix},$$

where ω is the frequency of the single side band modulation and TS is the time passed since the reference time (e.g. the beginning of a certain control protocol); (2) keep track of frame-of-reference rotations, as given by $$\begin{pmatrix} CP_1 \\ CP_2 \end{pmatrix} = \begin{pmatrix} \cos(\phi) & -\sin(\phi) \\ \sin(\phi) & \cos(\phi) \end{pmatrix} \begin{pmatrix} CP_1' \\ CP_2' \end{pmatrix},$$

where φ is the total phase that the frame of reference accumulated since the reference time; and/or (3) perform an IQ-mixer correction $$\begin{pmatrix} CP_1 \\ CP_2 \end{pmatrix} = \begin{pmatrix} C_{00} & C_{01} \\ C_{10} & C_{11} \end{pmatrix} \begin{pmatrix} CP_1' \\ CP_2' \end{pmatrix},$$

where $C_{00}$, $C_{01}$, $C_{10}$, and $C_{11}$ are the elements of a matrix that corrects for IQ-mixer imperfections. In an example implementation, each modification settings circuit, 504$_k$, contains registers that contain the matrix elements of three matrices:

$$C_k = \begin{pmatrix} C_{k00} & C_{k01} \\ C_{k10} & C_{k11} \end{pmatrix},$$

an IQ-mixer correction matrix;

$$S_k = \begin{pmatrix} \cos(\omega_k * TS * T_{clck1}) & -\sin(\omega_k * TS) * T_{clck1} \\ \sin(\omega_k * TS * T_{clck1}) & \cos(\omega_k * TS * T_{clck1}) \end{pmatrix},$$

a single side band frequency modulation matrix; and $$F_k = \begin{pmatrix} \cos(\phi_k) & -\sin(\phi_k) \\ \sin(\phi_k) & \cos(\phi_k) \end{pmatrix},$$

a frame rotation matrix, which rotates the IQ axes around the axis perpendicular to the IQ plane (I.e. the z-axis if I and Q are the x-axis and y-axis). In an example implementation, each modification settings circuit 504$_k$ also contains registers that contain the elements of the matrix products $C_k S_k F_k$ and $S_k F_k$.

In the example shown, each pulse modification circuit 508$_r$ is operable to process two raw outbound pulses CP′$_{2r}$ and CP′$_{2r+1}$ according to: the modification settings ops_cnfg$_{2r}$ and ops_cnfg$_{2r+1}$; the signals ops_ctrl$_{2r}$ and ops_ctrl$_{2r+1}$; and the signals pair$_{2r}$ and pair$_{2r+1}$. In an example implementation pair$_{2r}$ and pair$_{2r+1}$ may be communicated as ops_ctrl$_{2r}$ and ops_ctrl$_{2r+1}$. The result of the processing is outbound pulses CP$_{2r}$ and CP$_{2r+1}$. Such processing may comprise adjusting a phase, frequency, and/or amplitude of the raw outbound pulses CP′$_{2r}$ and CP′$_{2+1}$. In an example implementation, ops_cnfg$_{2r}$ and ops_cnfg$_{2r+1}$ are in the form of a matrix comprising real and/or complex numbers and the processing comprises matrix multiplication involving a matrix representation of the raw outbound pulses CP$_{2r}$ and CP$_{2r+1}$ and the ops_cnfg$_{2r}$ and ops_cnfg$_{2r+1}$ matrix.

The control circuitry 502 is operable to exchange information with the pulser circuits 302$_0$-302$_{L-1}$ to generate values of ops_config$_0$-ops_config$_{L-1}$ and f_demod$_0$-f_demod$_{L-1}$, to control routing circuitry 506 based on signals ops_slct$_0$-ops_slct$_{L-1}$ and dmod_slct$_0$-dmod_slct$_{L-1}$, and to update pulse modification settings circuits 504$_0$-504$_{K-1}$ based on IF$_0$-IF$_{L-1}$ and F$_0$-F$_{L-1}$ such that pulse modification settings output to pulse operations circuitry 358 are specifically tailored to each raw outbound pulse (e.g., to which quantum element 222 the pulse is destined, to which signal path 313 the pulse is destined, etc.) to be processed by pulse operations circuitry 358.

Each modification settings circuit 504$_k$ comprises circuitry operable to store modification settings for later retrieval and communication to the pulse operations circuitry 358. The modification settings stored in each modification settings circuit 504$_k$ may be in the form of one or more two-dimensional complex-valued matrices. Each signal path 313$_0$-313$_{k-1}$ may have particular characteristics (e.g., non-idealities of interconnect, mixers, switches, attenuators, amplifiers, and/or circuits along the paths) to be accounted for by the pulse modification operations. Similarly, each quantum element 122$_0$-122$_k$ may have a particular characteristics (e.g. resonance frequency, frame of reference, etc.). In an example implementation, the number of pulse modification settings, K, stored in the circuits 504 corresponds to the number of quantum element 122$_0$-122$_{K-1}$ and of signal paths 313$_0$-313$_{k-1}$ such that each of the modification settings circuits 504$_0$-504$_{K-1}$ stores modification settings for a respective one of the quantum elements 122$_0$-122$_{K-1}$ and/or paths 313$_0$-313$_{k-1}$. In other implementations, there may be more or fewer pulse modification circuits 504 than signal paths 313 and more or fewer pulse modification circuits 504 than quantum elements 122 and more or fewer signal paths 313 than quantum elements 122. The control circuitry 502 may load values into the modification settings circuit $504_0$-$504_{K-1}$ via signal 503.

The routing circuitry 506 is operable to route modification settings from the modification settings circuits $504_0$-$504_{L-1}$ to the pulse operations circuit 358 (as ops_confg$_0$-ops_confg$_{L-1}$) and to the pulsers $302_0$-$302_{L-1}$ (as f_dmod$_0$-f_dmod$_{L-1}$). In the example implementation shown, which of the modification settings circuits $504_0$-$504_{k-1}$ has its/their contents sent to which of the pulse modification circuits 5080-508R-1 and to which of the pulsers $302_0$-$302_{L-1}$ is controlled by the signal 505 from the control circuitry 502.

The signal ops_sich informs the pulse operations manager 356 as to which modification settings circuit $504_k$ to send to the pulse modification circuit $508_l$. The pulser $302_l$ may determine ops_slct$_l$ based on the particular quantum element $122_k$ and/or signal path $313_k$ to which the pulse is to be transmitted (e.g., the resonant frequency of the quantum element, frame of reference, and/or mixer correction). The determination of which quantum element and/or signal path to which a particular pulser $302_l$ is to send an outbound pulse at a particular time may be predetermined in the pulse program description or may be determined based on calculations performed by the pulser 302; and/or others of the pulsers $302_0$-$302_{L-1}$ during runtime. The control circuitry 502 may then use this information to configure the routing block 506 such that the correct modification settings are routed to the correct one or more of the pulse modification circuits $508_0$-$508_{L-1}$.

In an example implementation, the digital signal IF$_l$ instructs the pulse operations manager 356 to update a frequency setting of the modification settings circuit $504_k$ indicated by ops_slct$_l$. In an example implementation, the frequency setting is the matrix $S_k$ (described above) and the signal IF$_l$ carries new values indicating the new $\omega_k$ to be used in the elements of the matrix $S_k$. The new values may, for example, be determined during a calibration routine (e.g., performed as an initial portion of the quantum algorithm) in which one or more of the pulsers $302_0$-$302_{L-1}$ sends a series of outbound pulses CP, each at a different carrier frequency, and then measures the corresponding inbound signals Al.

In an example implementation, the signal F$_l$ instructs the pulse operations manager 356 to update a frame setting of the modification settings circuit $504_k$ indicated by ops_slct$_l$. In an example implementation, the frame setting is the matrix $F_k$ (described above) and the signal F$_l$ carries a rotation matrix F$_l$ which multiplies with $F_k$ to rotate $F_k$. This can be written as $$F_k = F_l F_k = \begin{pmatrix} \cos(\Delta\phi) & -\sin(\Delta\phi) \\ \sin(\Delta\phi) & \cos(\Delta\phi) \end{pmatrix} \begin{pmatrix} \cos(\phi_k) & -\sin(\phi_k) \\ \sin(\phi_k) & \cos(\phi_k) \end{pmatrix} = \begin{pmatrix} \cos(\phi_k + \Delta\phi) & -\sin(\phi_k + \Delta\phi) \\ \sin(\phi_k + \Delta\phi) & \cos(\phi_k + \Delta\phi) \end{pmatrix},$$

where $\phi_k$ is the frame of reference before the rotation and $\Delta\phi$ is the amount by which to rotate the frame of reference. The pulser $302_l$ may determine $\Delta\phi$ based on a predetermined algorithm or based on calculations performed by the pulsers $302_l$ and/or others of the pulsers $302_0$-$302_{L-1}$ during runtime.

In an example implementation, the signal dmod_sclt$_l$ informs the pulse operations manager 356 from which of the modification settings circuits $504_k$ to retrieve values to be sent to pulser $302_l$ as f_dmod$_l$. The pulser $302_l$ may determine dmod_slct$_l$ based on the particular quantum element $122_k$ and/or signal path $315_k$ from which the pulse to be processed arrived. The determination of from which quantum element and/or signal path a particular pulser 302, is to process an inbound pulse at a particular time may be predetermined in the pulse program description or may be determined based on calculations performed by the pulser 302; and/or others of the pulsers $302_0$-$302_{L-1}$ during runtime. The control circuitry 502 may then use this information to configure the routing block 506 such that the correct modification settings are routed to the correct one of the pulsers $302_0$-$302_{L-1}$. For example, when pulse generation circuit $302_l$ needs to demodulate a pulse signal Al from quantum element $122_k$, it will send a dmod_sclt$_l$ signal instructing the pulse operation manager 356 to rout the element $SF_{k00}$=COS $(\omega_k$*time_stamp+$\phi_k)$ from modification settings circuit $504_k$ to pulser $302_l$ (as f_dmod$_l$).

In the example implementation shown, the digital signals $C_0$-$C_{k-1}$ provide information about signal-path-specific modification settings to be used for each of the signal paths $313_0$-$313_{K-1}$. For example, each signal $C_k$ may comprise a matrix to be multiplied by a matrix representation of a raw outbound pulse CP'$_l$ such that the resulting output outbound pulse is pre-compensated for errors (e.g., resulting from imperfections in mixers, amplifiers, wiring, etc.) introduced as the outbound pulse propagates along signal path $313_k$. The result of the pre-compensation is that output outbound pulse CP$_l$ will have the proper characteristics upon arriving at the quantum processor 218. The signals $C_0$-$C_{K-1}$ may, for example, be calculated by the quantum controller 210 itself, by the programming subsystem 202, and/or by external calibration equipment and provided via I/O manager 368. The calculation of signals may be done as part of a calibration routine which may be performed before a quantum algorithm and/or may be determined/adapted in real-time as part of a quantum algorithm (e.g., to compensate for temperature changes during the quantum algorithm).

Figures 6A, 6B:
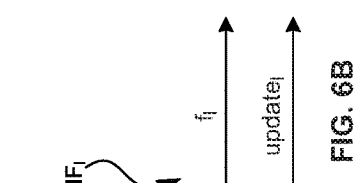
FIG. 6A shows frequency generation circuitry of the quantum controller of FIG. 3B.
FIG. 6B shows example components of the control signal IF of FIG. 6A.

FIG. 6A shows frequency generation circuitry of the quantum controller of FIG. 3B. In the example implementation shown, the frequency generation circuitry is part of control circuitry 502 of pulse operations manager circuitry 356. The frequency generation circuitry comprises K coordinate rotation digital computer (CORDIC) circuits $602_0$-$602_{K-1}$, phase generation circuitry 604, timestamp register 606, and S-Matrix generation circuitry 608.

Each CORDIC circuit $602_k$ is operable to compute cosine and sine of its input, $\theta_k$, thus generating two signals cos ($\theta_k$) and sin ($\theta_k$).

The phase generation circuitry 604 is operable to generate the CORDIC input parameters $\theta_0$-$\theta_{K-1}$ based on: (1) the frequency setting signals $IF_0$-$IF_{L-1}$ from the pulsers $302_0$-$302_{L-1}$; and (2) the contents, TS, of the timestamp register 606.

The timestamp register 606 comprises circuitry (e.g., a counter incremented on each cycle of the clock signal clk1) operable to track the number of cycles of clk1 since a reference point in time (e.g., power up of the quantum controller 210, start of execution of set of instructions of a quantum algorithm by the quantum controller 210, etc.).

In the example shown, the phase generation circuitry 604 sets $\theta_0$=$2\pi f_0$ (TS) (dt$_{clk1}$), where $f_0$ is a frequency determined from the signal $IF_0$, TS is the number of clock cycles counted from the reference point and dtak is the duration of a single clock cycle of clk1. This leads to the CORDIC outputs being a pair of phase-quadrature reference signals, cos ($2\pi f_0$ (TS) (dt$_{clk1}$)) and sin ($2\pi f_0$(TS) (dt$_{clk1}$)), as in the example shown, which are used to generate the So rotation matrix that rotates at a frequency $f_0$.

As shown in FIG. 6B, the signal $IF_I$ may comprise an update component and an $f_I$ component. In an example implementation, when update: is asserted then the phase generation circuitry updates one of more of $f_0$-$f_{K-1}$ to be the value of $f_I$.

The S-matrix generation circuitry 608 is operable to build the matrices $S_0$-$S_{K-1}$ from the outputs of the CORDIC circuits 602$_0$-602$_{K-1}$. In an example implementation, the S-matrix generation circuit 608 is operable to synchronize changes to the S matrices such that any matrix update occurs on a desired cycle of clock clk1 (which may be determined by the control information $IF_0$-$IF_{L-1}$).

With K CORDIC circuits 602$_k$, the frequency generation circuitry is operable to concurrently generate K S-matrices. In instances that more than K frequencies are needed over the course of a set of instructions, the phase generation circuit 604 is operable to change the input parameter $\theta_k$ of one or more of the CORDIC circuits 602$_0$-602$_{K-1}$ to stop generating one frequency and start generating the $K+1^{th}$ frequency. In some instances, it may be necessary for the new frequency to start at a phase $\theta$ that would have been the phase if the new frequency was being generated from the initial reference time (e.g., because the new frequency would be used to address a quantum element that has a resonance at the new frequency and that was coherent since the reference point). In some other instances, it might be necessary to start the new frequency from the phase that the old frequency ended in. The phase generation circuit 604 and timestamp register 606 enable both of these possibilities.

Figure 7:
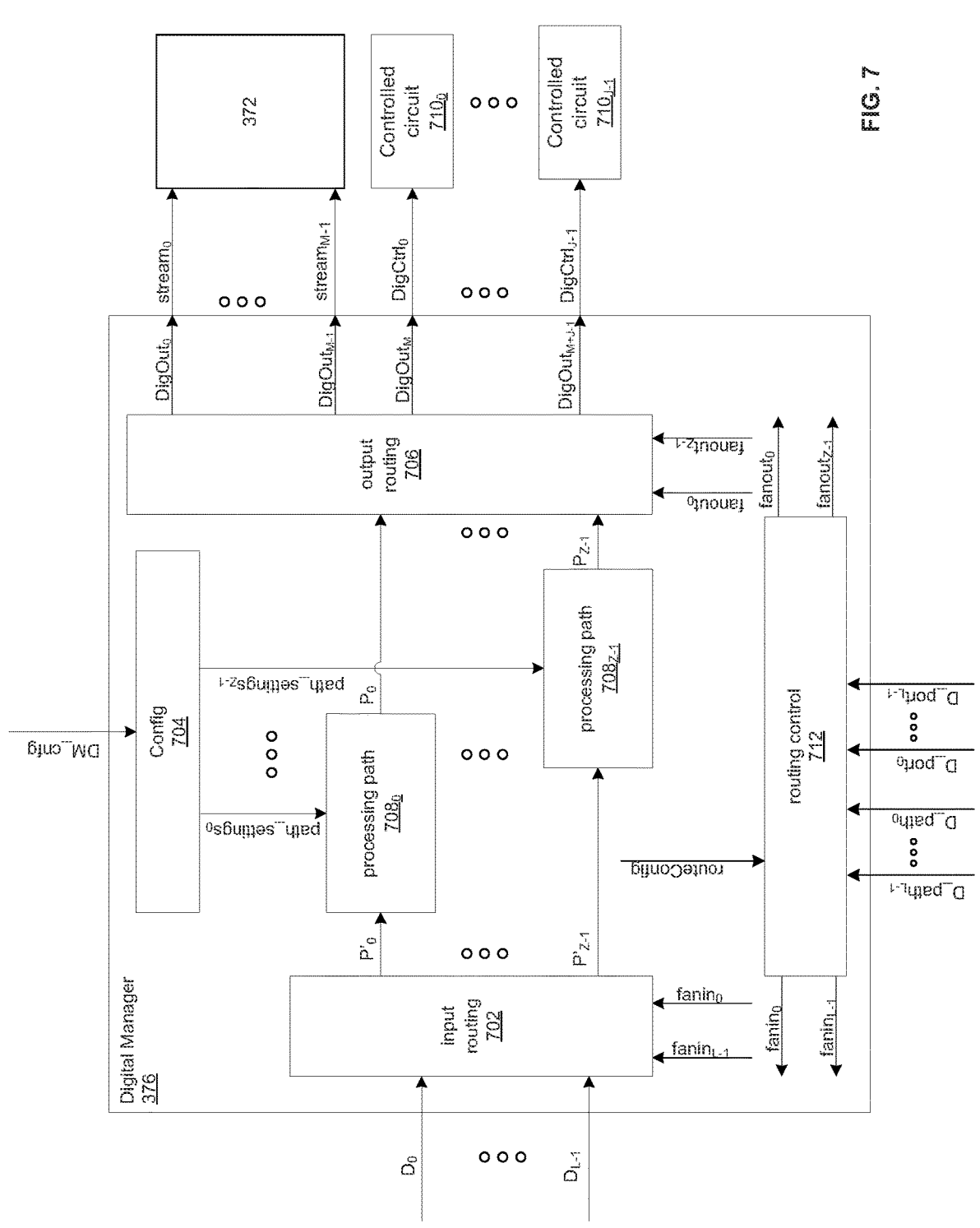
FIG. 7 shows an example implementation of the digital manager of FIG. 3B.

FIG. 7 shows an example implementation of the digital manager of FIG. 3B. Shown in FIG. 7 are the digital manager 376, controlled circuits 710$_0$-710$_{J-1}$, and input manager 372.

The example implementation of the digital manager 376 comprises input routing circuit 702, configuration circuit 704, output routing circuit 706, processing paths 708$_0$-708$_{Z-1}$ (where Z is an integer), and routing control circuit 712.

The configuration circuit 704 is operable to store configuration settings and use those settings to configure the processing paths 708$_0$-708$_{Z-1}$ and/or the routing controller 712. The settings may, for example, be loaded via the signal DM_config as part of the pulse program description provided by quantum programming subsystem 202. The settings may comprise, for example, one or more of: a bitmap on which may be based a determination of which of signals $D_0$-$D_{L-1}$ to route to which of signals $P'_0$-$P'_{Z-1}$ for one or more instructions of a quantum algorithm; a bitmap on which may be based a determination of which processing path outputs $P_0$-$P_{Z-1}$ to route to which of DigOut$_0$-DigOut$_{J+M-1}$ for one or more instructions of a quantum algorithm; and one or more bit patterns which processing paths 708$_0$-708$_{Z-1}$ may convolve with one or more of the signals $P'_0$-$P'_{Z-1}$ for one or more instructions of a quantum algorithm.

The input routing circuit 702 is operable to route each of the digital signals Do-Di-1 to one or more of the processing paths 708$_0$-708$_{Z-1}$. At any given time (e.g., for any particular instruction of every pulser 302$_I$ of pulsers 302$_0$-302$_L$), the input routing circuit 702 may determine to which of the processing paths 708$_0$-708$_{Z-1}$ to rout the signal $D_I$ of signals $D_0$-$D_{L-1}$ based on the signal fanin$_I$ of signals fanin$_0$-fanin$_{L-1}$. That is, for a particular instruction, the digital signal $D_I$ may be routed to any one or more of paths 708$_0$-708$_{Z-1}$ based on the value of fanin$_I$ for that instruction. For example, fanin$_I$ may be a Z-bit signal and a state of each bit of fanin$_I$ during a particular instruction may indicate whether $D_I$ is to be routed to a corresponding one of the Z processing paths

708$_0$-708$_{Z-1}$ during that instruction. An example implementation of the input routing circuit 702 is described below with reference to FIG. 8.

The output routing circuit 706 is operable to route each of the digital signals $P_0$-Pz-1 to one or more of DigOut$_0$-DigOut$_{J+M-1}$ (In the example shown DigOut$_0$-DigOut$_{J+M-1}$ connect to stream$_0$-stream$_{M-1}$, respectively, and DigOut$_M$-DigOut$_{J+M-1}$ connect to DigCtrl0-DigCtrlJ-1, respectively). At any given time (e.g., for any particular instruction of every pulser 302$_I$ of pulsers 302$_0$-302$_L$), the output routing circuit 706 may determine to which of DigOut$_0$-DigOut$_{J+M-1}$ to rout the signal $P_I$ of the signals $P_0$-$P_{L-1}$ based on the signal fanout of signals fanout$_0$-fanout$_{Z-1}$. That is, for a particular instruction, the digital signal $P_z$ (z an integer between $_0$ and Z) may be routed to any one or more of DigOut$_0$-DigOut$_{J+M-1}$ based on the value of fanout, for that instruction. For example, values of fanout$_z$ may be (J+M-1) bits and a state of each bit of fanout, during a particular instruction may indicate whether Pz is to be routed to a corresponding one of the J+M-1 signals DigOut during that instruction. An example implementation of the output routing circuit 704 is described below with reference to FIG. 8.

Each of the processing path circuits 708$_0$-708$_{Z-1}$ is operable to manipulate a respective one of signals $P'_0$-$P'_{Z-1}$ to generate a corresponding manipulated signal $P_0$-$P_{Z-1}$. The manipulation may comprise, for example, introducing a delay to the signal such that the resulting one or more of DigOut$_0$-DigOut$_{J+M-1}$ reach(es) its/their destination (a controlled circuit 710 and/or input manager 372) at the proper time with respect to the time of arrival of a corresponding quantum control pulse at the corresponding destination.

Each of the controlled circuits 710$_0$-710$_{J-1}$ and input manager 372 is a circuit which, at least some of the time, needs to operate synchronously with quantum control pulses generated by one or more of pulsers 302$_0$-302$_{L-1}$ (possibly a reflection/return pulse from a quantum processor in the case of input manager 372). Accordingly, each of the control circuits 710$_0$-710$_{J-1}$ receives a respective one of control signals DigOut$_0$-DigCtrl$_{J-1}$ that is synchronized with a respective quantum control pulse. Similarly, input manager 372 receives a plurality of the DigOut signals (one for each stream input).

The routing controller 712 comprises circuitry operable to generate signals fanin$_0$-fanin$_{L-1}$ and fanout$_0$-fanout$_{Z-1}$ based on D_path$_0$-D_path$_{L-1}$, D_port$_0$-D_port$_{L-1}$, and/or information stored in configuration circuit 704.

Figure 8:
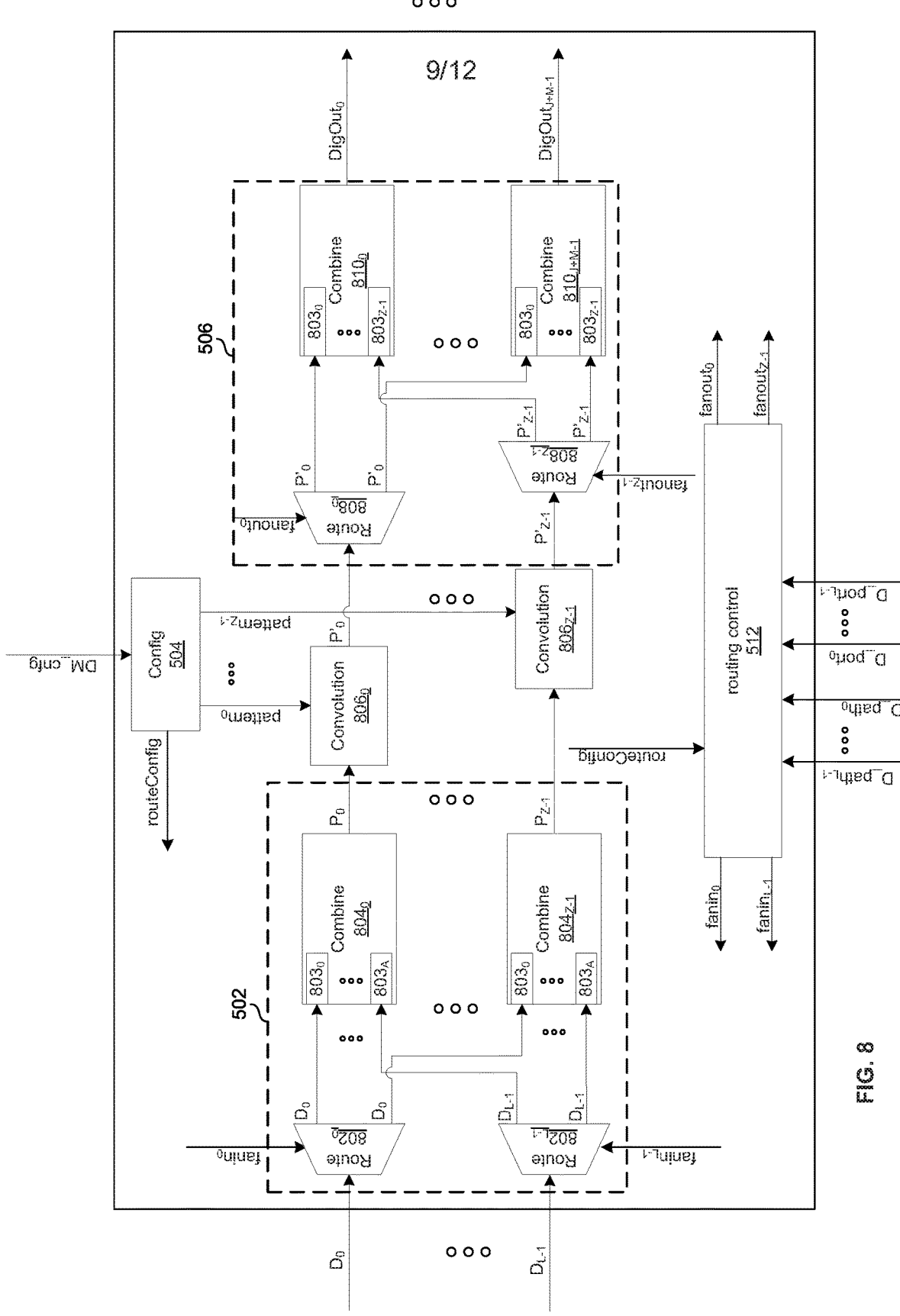
FIG. 8 shows an example implementation of the digital manager of FIG. 3B.

FIG. 8 shows an example implementation of the digital manager of FIG. 3B. The example input routing circuit 502 comprises routing circuits 8020-802L-1 and combining circuits 8040-804L-1. The example output routing circuitry 506 comprises routing circuits 8080-808Z-1 and combining circuits 8100-810J-1. The example processing path circuits are convolution circuits 8060-806Z-1. Any one or more of the routing circuits 8020-802L-1 and combining circuits 8040-804L-1 may be configured to implement a delay, the duration of which is programmable.

Each of the routing circuits 802$_0$-802$_L$ is operable to route a respective one of signals $D_0$-$D_{L-1}$ to one or more of the combining circuits 804$_0$-804$_{Z-1}$. To which of combining circuit(s) 804$_0$-804$_{Z-1}$ the signal Di is routed is determined based on the signal fanin$_I$. In an example implementation, each signal fanin$_L$ is a Z-bits signal and, for a pulser$_I$ instruction, the value of bit z of the signal fanin$_I$ determines whether the signal Di is to be routed to combining circuit 804$_z$ for that instruction. The value of fanin; may be updated on a per-instruction basis.

Each of combining circuits $804_0$-$804_{Z-1}$ is operable to combine up to L of the signals D0-DL-1 to generate a corresponding one of signals $P_0$-$P_{Z-1}$. In an example implementation, the combining comprises OR-ing together the values of the up to L signals.

Each of the routing circuits $808_0$-$808_{Z-1}$ is operable to route a respective one of signals $P'_0$-$P'_{Z-1}$ to one or more of the combining circuits $810_0$-$810_{J-1}$. To which of combining circuit(s) $810_0$-$810_{J-1}$ the signal $P'_z$ is routed is determined based on the signal $fanout_z$. In an example implementation, each signal $fanout_z$ is a (J+M-1)-bit signal and the value of bit j+m-1 of the signal $fanout_z$ determines whether the signal $P'_z$ is to be routed to combining circuit $804_{j+m-1}$. In an example implementation the value of $fanout_z$ is preconfigured before the run-time of the quantum algorithm, however, in another implementation it may be updated dynamically (e.g., on a per-instruction basis).

Each combining circuit of combining circuits $810_0$-$810_{J-1}$ is operable to combine up to Z of the signals $P'_0$-$P'_{Z-1}$ (received via inputs $803_0$ to $803_{Z-1}$) to generate a corresponding one of signals $DigOut_0$-$DigOut_{J+M-1}$. In an example implementation, the combining comprises OR-ing together the values of the up to Z signals.

Each convolution circuit $806_z$ is operable to convolve signal $P_z$ with $pattern_z$ to generate signal $P'_z$. In an example implementation, pattern is preconfigured before run-time of the quantum algorithm, however, in another implementation it may be updated dynamically. $pattern_z$ may be determined based on: the destination(s) of signal Pz (e.g., to which of controlled circuits 510 and/or input of input manager 352 Pz is intended); characteristics of the corresponding quantum control pulse (e.g., any one or more of its frequency, phase, amplitude, and/or duration); and/or process, temperature, and/or voltage variations. One or more of the convolution circuits $806_0$-$802_{Z-1}$ may be configured to implement a delay (e.g., via an output buffer), the duration of which is programmable.

Figure 9A:
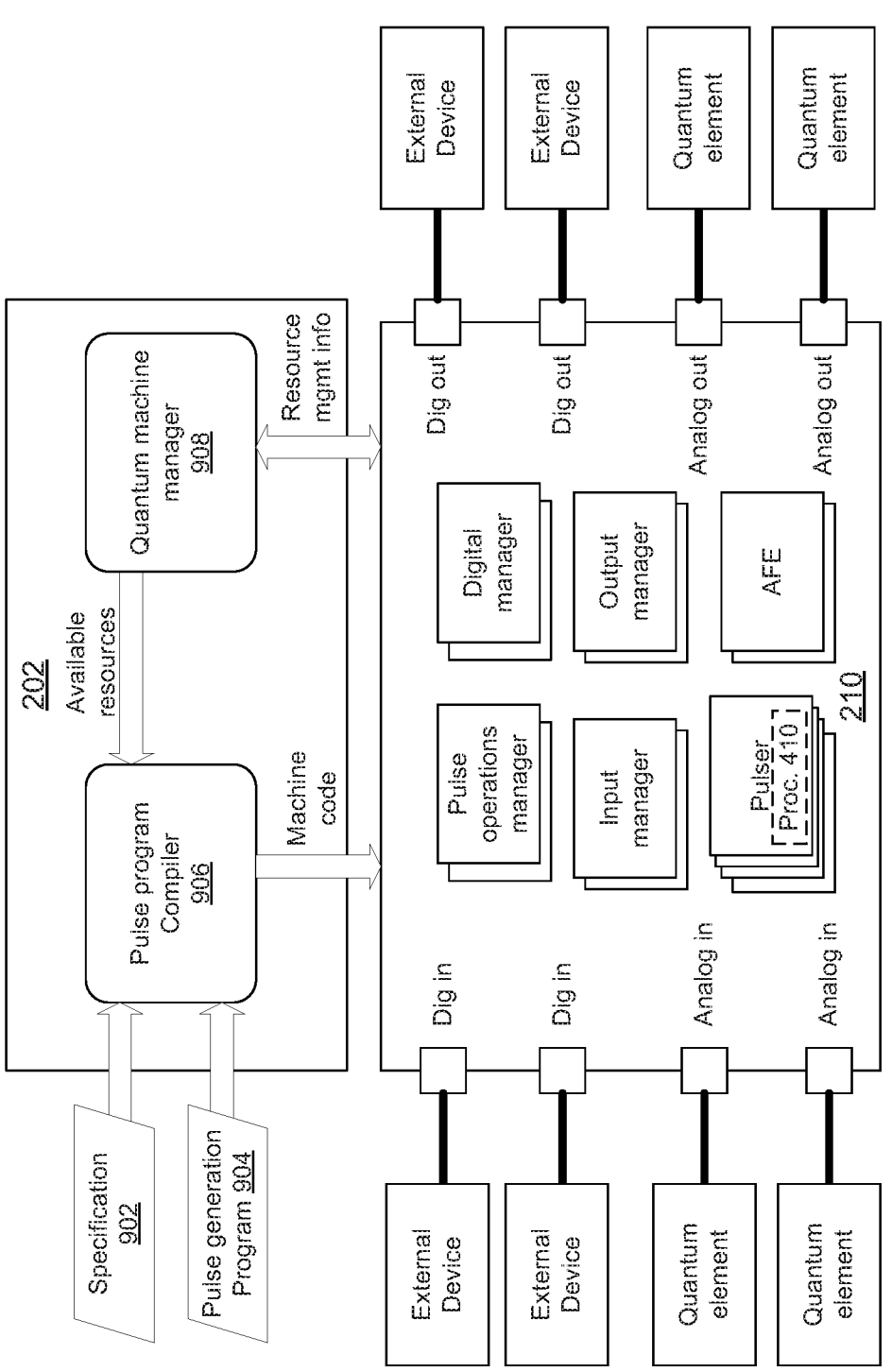
FIG. 9A illustrates configuration and control of the quantum controller via the quantum programming subsystem.

FIG. 9A illustrates configuration and control of the quantum controller via the quantum programming subsystem. In FIG. 9A, the quantum controller 210 comprises one or more instances of various circuits (such as the pulser, input manager, output manager, digital manager, pulse operations manager, and analog front end circuits described above). Connected to the inputs and outputs of the quantum controller 210 may be a plurality of external devices (e.g., oscilloscopes, waveform generators, spectrum analyzers, mixers, amplifiers, etc.) and a plurality of quantum elements. These physical circuits can be allocated and deallocated independently of one another such that the physical resources of the quantum controller 210, and the quantum elements and external devices connected to the quantum controller 210 via the analog and digital inputs and outputs, can be organized into one or more "quantum machines."

Also shown in FIG. 9A are a compiler 906 and quantum machines manager 908 of the quantum programming subsystem 202.

The compiler 906 comprises circuitry operable to generate a machine code pulse program description 206 based on: (1) a specification 902; (2) a pulse generation program 904; and (3) a resources management data structure from the quantum machines manager 908.

Figure 9B:
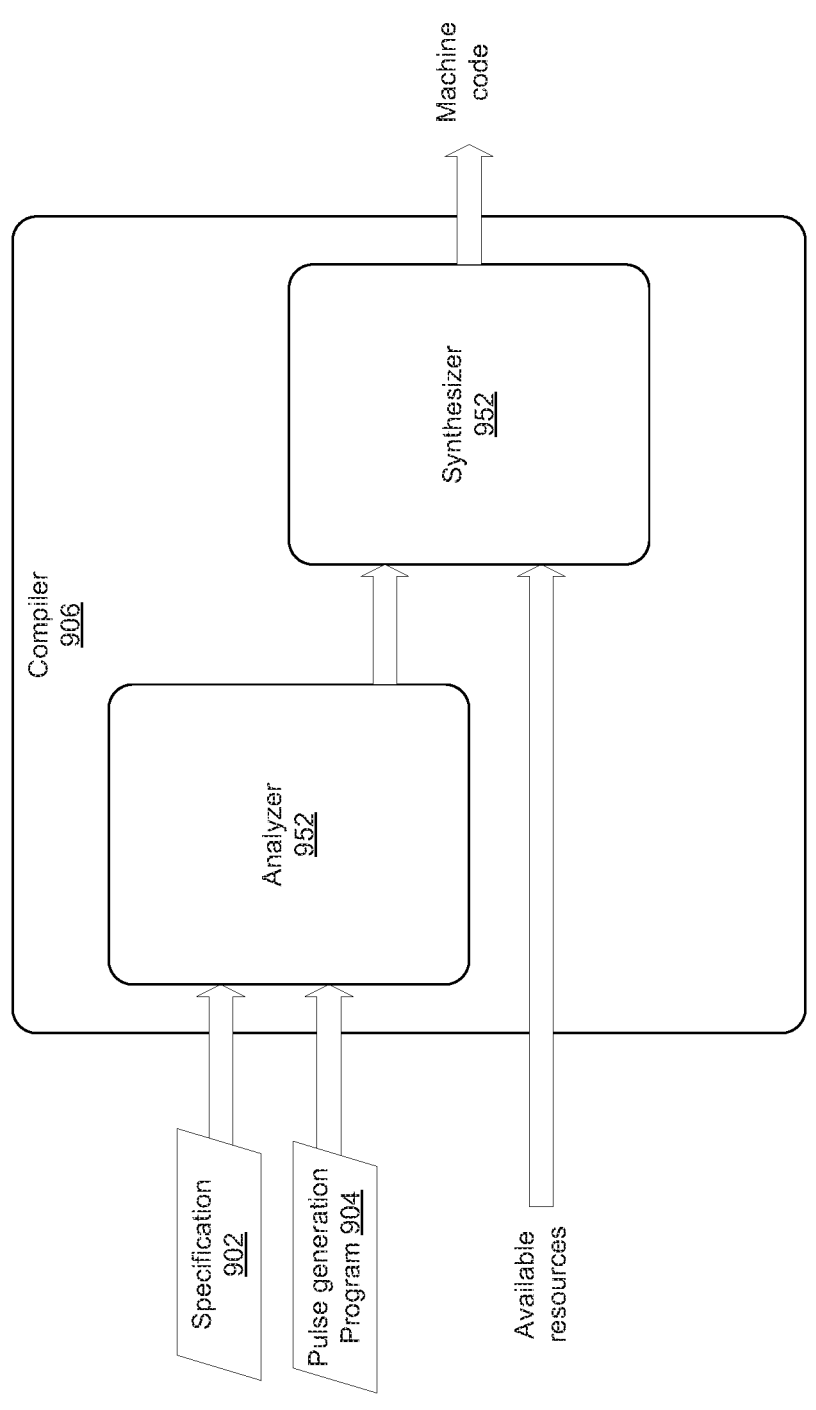
FIG. 9B illustrates an example implementation of the compiler of FIG. 9A.

Referring to FIG. 9B, an example implementation of the compiler 906 comprises analyzer circuitry 952 and synthesizer circuitry 954. The analyzer circuitry 952 is operable to parse the specification 902 and program 904 to generate an intermediate code representation (e.g., a parse tree). The synthesizer circuitry 954 is operable to generate machine code based on the intermediate code representation and the available resources indicated by the quantum machines manager 908.

The specification 902 identifies resources of a quantum machine some of which are mapped to physical circuits during an instantiation of a quantum machines (e.g. input and output ports of the quantum controller 210), and some of which the compiler attaches to physical circuits of the quantum controller 210 during compilation of a Pulse generation Program 904. The compiler 906 may allocate resources for executing the program 904 based on the specification 902, the program 904, and/or the available resources indicated by the quantum machines manager 908. As an example, assume a scenario in which there are five quantum elements in the specification 902 and the program 904 uses only two of the quantum elements; the number of the pulsers $302_0$-$302_L$ allocated may depend on the available resources and the specifics of the program 904. In one case the compiler 906 may allocate a first number (e.g., two) of the pulsers $302_0$-$302_L$ for interfacing with the two quantum elements and in another case the compiler may allocate a second number (e.g., four) for sending pulses to the two quantum elements. In an example implementation, PYTHON is used as a "host" language for the specification and the specification is a PYTHON dictionary. In this example implementation the PYTHON syntax/constructs can thus be leveraged to create the specification (PYTHON variables, functions, etc.).

The pulse generation program 904 comprises statements that define a sequence of operations to be performed by the quantum machine defined in the specification 902. Such operations typically include the generation of one or more analog pulses to be sent to a controlled element, such as a quantum element. Such operations typically include measuring one or more return pulses from an element. The pulse generation program is also referred to herein as a QUA program. Functions, syntax, etc. of the QUA programming language are described below. In an example implementation, PYTHON is used as a "host" language for the QUA program. This allows leveraging PYTHON syntax/constructs (PYTHON variables, functions, etc.) to generate the QUA program, but it is still a QUA-not PYTHON-program to be compiled by the compiler 906 to generate QOP machine code, and to be executed on the quantum controller/s 210.

In an example implementation, a QUA program defines the sequence of statements for: (1) Generating, shaping and sending pulses to the quantum device; (2) Measuring of pulses returning from the quantum device; (3) Performing real-time classical calculations on the measured data and storing results in classical variables; (4) Performing real-time classical calculations on classical variables; (5) Controlling the flow of the program, including branching statements; (6) Streaming of data from the quantum controller 210 to the quantum programing system 202 and processing and saving it in the quantum programing system 202, and/or (6) based on processing results, reconfigure the quantum controller 210 for improved operation.

In addition to the specification of which pulses are played, a QUA program can also specify when they should be played through both explicit and implicit statements and dependency constructs. Thus, a QUA program can define exactly the timing in which pulses are played, down to the single sample level and single clock cycles of the quantum controller 210.

In an example implementation, machine code instructions generated from the pulse program description 206 and executable by the quantum controller 210 include one or more of the following fields: addr0, addr1, force_return, use_jump, branch_method, step_to_grid, length_offset_enable, length, seq_stream_enable, sync, break_enable, last, pause, pulse_addr, pulse_method, digital_addr, digital_route, digital_head, prog_addr, prog_delay, frame_cos, frame_sin, frame_enable, frame_dynamic_enable, csf_index, c_update_index, c_update, s_update, s_update_index, phase_reset, iq_mode, g_enable, keep_last, ramp_to_zero, analog_port, mode, conditional pulse.

I. ANALOG PULSE

During each instruction, a pulser 302I can generate a pulse to a certain desired quantum element. As discussed above, some pulses are sent to the quantum processor 218 from a single output port, while some pulses are sent by mixing two signals, called an IQ-pair, from two output ports, with a local oscillator signal in an IQ-mixer and then sending the resulting pulse to the quantum processor 218. Thus, in an example implementation, the Pulsers $302_0$-$302_L$ are organized in pairs-(Pulser_I0, Pulser_Q0), (Pulser$_{I1}$, Pulser$_{Q1}$), . . . , (Pulser$_{I5}$, Pulser$_{Q5}$). In each instruction, each pulser $302_{I1}$ can either play a single independent pulse, or it can play an IQ-pair together with its paired pulser $302_{I2}$. This is specified in the IQ_mode field of the instruction. IQ_mode: indicates whether the Pulser is playing independently, or playing an IQ pair with its paired Pulser The following sections illustrate an example implementation in which the pulse is generated and played in three steps: 1. Generating the Raw Waveform; 2. General Manipulation; 3. Quantum Element Specification

1. GENERATING THE RAW WAVEFORM, $I_R(t)$ ($Q_R(t)$)

A pulser instruction contains a pulse_addr field, which points to an address in the pulse memory 404 where waveforms are saved.

In addition to the pulse_addr field, another 2-bit field of a pulser instruction, called pulse_method, defines how to generate the raw waveforms from the data in the pulse memory 404.

pulse_method: 2 bits specifying the method for generating the pulse (see table below)

If pulse_method=10, then to generate the raw pulse the pulser also uses an interpolation_step value, which may be stored in a register use by CSP 410 in 2's complement representation and span the range [0,2). The interpolation itself may be generated in two phases:

(i) Non-interpolated header-A first period (e.g., 60 ns or some other duration) of samples (e.g., 15 memory lines worth of samples) are recorded directly from the pulse memory lines.

(ii) Interpolated Trailer-interpolation samples are stored in the pulse memory with interpolation step granularity. The interpolation values are computed given the four nearest interpolation points, f (−1), f (0),f (1),f (2) as follows:

$$f(t) = \left( \frac{f(-1) \cdot t \cdot (t-1) \cdot (t-2)}{6} + \frac{f(0) \cdot (t+1) \cdot (t-1) \cdot (t-2)}{2} \right) - \left( \frac{f(1) \cdot (t+1) \cdot t \cdot (t-2)}{2} + \frac{f(2) \cdot (t+1) \cdot t \cdot (t-1)}{6} \right)$$

$$0 \le t \le 1, t = n \cdot \text{interp\_step}$$

As an example, for interpolation step 30'h020000000 (0.0625), samples S0. . . S40 are stored in the first 10 memory lines Addr0 . . . Addr9. For the first interpolation memory line Addr10 will include S23, S39, S55, S71 which represent f (−1), f (0), f (1) and f (2) accordingly, with regards to S40 . . . S54,

2. GENERAL MANIPULATION

A g_enable field of the pulser instruction indicates whether or not to apply a general linear transformation, coming from a CSP 410, to the raw waveform.

There are two cases for what the general transformation itself can mean, depending on whether the pulser is playing an independent pulse (IQ_mode=0), or an IQ-pair with its paired Pulser (IQ_mode=1). In the IQ_mode=0 case, a general linear transformation is simply a multiplication by a factor:

$$I = G_{00} I_R \text{ (for Pulser } I \text{ independently)}$$

$$Q = G_{11} Q_R \text{ (for Pulser } Q \text{ independently)}$$

Where $G_{00}$ and $G_{11}$ are values (e.g., stored in registers) calculated by the CSP 410. In instances that there is one CSP 410 for each Pulser, then Goo and Gu can come from different the CSPs (I and Q, respectively). In the IQ_mode=1

| a. Interpolation Protocol | |
| --- | --- |
| 00: constant pulse | Play the value stored at pulse_addr for the entire length of the instruction |
| 01: arbitrary pulse | Play stored values starting at pulse_addr one by one (e.g., taking K samples each cycle, where K could be, for example, 4 or some other integer number) for the entire length of the instruction |
| 10: compressed | Interpolate the pulse saved in memory at pulse_addr according to an interpolation_step value for the entire length of the instruction (see interpolation protocol section below) |
| 11: ramp pulse | play a linear pulse of K (e.g., 4 or some other integer number) samples per cycle with a slope determined by an interpolation step value (see interpolation protocol section below). The slope may vary every cycle and the initial value at each cycle is the last value of the previous cycle (or '0' for the first cycle in the instruction). This helps to avoid frequency spikes when a pulse begins at a much different amplitude than the amplitude at which the previous pulse ended | case, a general linear transformation is a multiplication of the IQ vector by a general 2×2 matrix:

$$\begin{pmatrix} I \\ Q \end{pmatrix} = \begin{pmatrix} G_{00} & G_{01} \\ G_{10} & G_{11} \end{pmatrix} \begin{pmatrix} I_R \\ Q_R \end{pmatrix}$$

where $G_{ij}$ are registers calculated by the CSP 410. In instances that there is one CSP 410 for each Pulser, then in the IQ_mode=1 case, either the G values are forced to come from a single CSP 410, or they come from a single CSP 410 or two CSPs 410 and can be chosen by the user (e.g., explicitly set by the user via software setting) or by the compiler.

The two cases can be compactly written as:

$$I = G_{00}I_R + (IQ\_mode)\, G_{01}Q_R$$

$$Q = (IQ\_mode)G_{10}I_R + G_{11}Q_R$$

Note: such general transformations are used when the pulse needs to be manipulated by the results of classical calculations. For example, the rotation angle of some qubit rotation can be a result of some calculation performed by a CSP 410 in which case $$G = \begin{pmatrix} g & 0 \\ 0 & g \end{pmatrix},$$

where g modifies the rotation angle.

Additional fields may be used for shaping the pulses such as:

keep_last: indicates whether the previous value of $$\begin{pmatrix} I \\ Q \end{pmatrix}$$

should be kept as the base value for a next pulse.

ramp_to_zero: field indicates whether pulse amplitude is to slowly decay to zero according to the G matrix dynamic modulation in a CSP 410.

3. QUANTUM ELEMENT SPECIFICATION

To produce the desired pulse to the desired quantum element, the waveforms, I (t) and Q (t), need to go through further transformations. There are three possible cases:

(i) IQ_mode=$_1$. The pulser is generating an IQ-pair with its paired pulser and therefore, the waveforms vector needs to be multiplied by the CSF matrix:

$$\begin{pmatrix} \tilde{I}(t) \\ \tilde{Q}(t) \end{pmatrix} = CSF \begin{pmatrix} I(t) \\ Q(t) \end{pmatrix}$$

(ii) IQ_mode=$_0$ with IF modulation. The pulser plays an independent pulse that is IF-modulated;

$\tilde{I}$=cos $(\omega_{IF}{}^I t + \phi_F)I$ (for pulser I independently)

$\tilde{Q}$=cos $(\omega_{IF}{}^Q t +_F) Q$ (for pulser Q independently)

Note that this can be written in terms of the SF matrix as:

$\tilde{I}=SF_{00}{}^I I,$ $\tilde{Q}=SF_{11}{}^Q Q$ (iii) IQ_mode=0 with no frequency modulation. The pulser plays an independent pulse as it is:

$\tilde{I}=I,$ $\tilde{Q}=Q,$

To allow the appropriate transformation to be specified and performed, a series of dedicated registers keep the CSF matrices of all quantum elements. These registers are placed in the pulse operations manager 356, which is accessible to all pulsers. If the correction matrix is set to the identity for quantum elements not connected through an IQ-mixer (The correction matrix is in any case calibrated and saved and thus, for a situation where there is no meaning for mixer correction the correction matrix is set to the identity), and if a "fake" CSF register always set to the identity is added, then all the three cases above can be satisfied by the following transformation:

$\tilde{I}=CSF_{00}{}^I I+ (IQ\_mode)CSF_{01}{}^I Q$ $\tilde{Q}=(IQ\_mode)CSF_{10}{}^Q I+CSF_{11}{}^Q Q$ where the CSF values matrix come from the register specified in the CSF_index field of the instruction.

CSF_index: specifies the CSF register to be used to transform the pulse.

Note that in the/Q_mode=$_1$ case, the user/compiler may be "smart" and have CSF$^I$=CSF$^Q$.

Finally, after the transformation, the analog_port field in the instruction directs the final pulse to the desired output port.

analog_port: specifies the output port to which to "play" (i.e., output) the pulse.

500 MSa/s Configuration

There is a configuration of the system in which two given outputs play at 500 MSa/s instead of at 1 GSa/s (the DAC is configured in dual channel mode). The value of a mode field in the pulse instruction indicates the configuration:

mode: specifies the DAC mode according to the following table

| 2'b00-Normal mode | 4 samples sent to the DAC every 4 ns for single port 1G transmission |
| 2'b01-Odd mode | 2 samples (only odd samples) sent to the DAC every 4 ns for dual port 500M transmission |
| 2'b10-Even mode | 2 samples (only even samples) sent to the DAC every 4 ns for dual port 500M transmission |

CONDITIONAL PULSE RELEASE

As discussed above, sometimes whether a pulse is to be sent to the quantum processor 218 may not be known until, for example, processing of an inbound pulse by CSP 410 is complete. But, waiting for the processing of the inbound to be complete before starting to generate the possibly-needed pulse may introduce undesirable latency. Accordingly, a pulser can begin generating the possibly-needed pulse and a field conditional_pulse can indicate that whether or not the pulse is to be released to the quantum processor 218 is to be determined by a signal coming from the CSP 410. In this manner, if the pulse is needed (as indicated by the signal from CSP 410) it is ready with low latency. If the pulse is not needed it can simply be dumped (e.g., shorted to ground).

II. FRAME UPDATES (VIRTUAL Z-ROTATION)

At the end of the instruction, the pulser can update the frame matrix. This allows performing virtual Z-rotations with (almost) zero latency and (almost) perfect fidelity. The update is done by multiplying the Frame matrix, F, of the CSF register used in the instruction (specified by CSF_index) with a $F_{\Delta\phi}$ matrix:

$$F_{\phi+\Delta\phi} = F_{\Delta\phi}F_\phi =$$

$$\begin{pmatrix} \cos(\Delta\phi) & -\sin(\Delta\phi) \\ \sin(\Delta\phi) & \cos(\Delta\phi) \end{pmatrix}\begin{pmatrix} \cos(\phi) & -\sin(\phi) \\ \sin(\phi) & \cos(\phi) \end{pmatrix} = \begin{pmatrix} \cos(\phi+\Delta\phi) & -\sin(\phi+\Delta\phi) \\ \sin(\phi+\Delta\phi) & \cos(\phi+\Delta\phi) \end{pmatrix}$$

A frame_enable field indicates whether the frame is to be updated. The $F_{66\,\phi}$ matrix may be given in the frame_cos and frame_sin fields.

frame_cos: specifyies the value of the cosine term of the frame matrix.

frame_sin: specifies the value of the sine term of the frame matrix.

In some instances, the frame may be calculated by a CSP 410 instead of being provided in the instructions. In such case, a frame_dynamic_enable being asserted may indicate that the frame matrix is to come from a CSP 410 rather than the frame_cos and frame_sin fields.

III. IF and CORRECTION MATRIX UPDATES

The IF matric (S matrix) and mixer correction matrix (C matrix) may be set using the following pulse instruction fields:

S_update: command to reload the IF frequency.

S_update_index: specifies which IF generation module to reload.

C_update: command to reload the mixer correction matrix frequency.

C_update_index: specifies which mixer correction matrix to reload.

phase_reset: if set, the global phase of the spin component of the CSF matrix at the csf_update_index is reset.

IV. DIGITAL PULSE

During each instruction, the pulser can generate a digital pattern to several digital output ports. The digital pattern is taken from the address in the digital memory, which is specified in the instruction field:

digital_addr: specifies the memory address of the beginning of the digital pattern.

The digital patterns are saved in the digital patterns memory in an encoded form and the pulser decodes them before sending to the digital port. Each digital memory address line stores $_4$ digital patterns, with the following formation:

Bits [14:0]-pattern length in 1 ns granularity. 15'b0 stands for infinite length (fixed pattern until end-of-instruction)

Bit-Digital value

Each digital pattern goes through the digital manager 354 before it is sent to one or more output ports. The digital manager 354 contains multiple (e.g., 12-10 for digital outputs, 2 for ADC streaming to memory (e.g., DDR RAM) for raw data analysis) digital routes (e.g., through input routing circuitry 702, processing paths 708, and output routing circuitry 706)), each (pre) configured to: (i) delay the digital pattern by a certain number of clock cycles; (ii) convolve the digital pattern with a certain convolution pattern; (iii) output the resulting digital pattern to one or more digital output ports.

The instruction field digital_route specifies to which digital routes to send the digital pattern.

digital_route: specifies to which of the digital output ports to send the digital pattern.

For example, if digital_route=100000000001, then the digital pattern will be sent to the first and last digital routes.

Finally, to save the latency resulting from the time it takes to bring the digital pattern from the digital memory 406, and to start playing the required digital pattern immediately with the beginning of the instruction, there is a dedicated instruction field digital_head that holds the values of the first 3 cycles of the digital pattern.

digital_head: specifies the value of the first 3 cycles of the digital pattern.

V. CSP PROGRAM

Each pulser instruction can trigger the execution of a CSP program that will start after a specified number of cycles from the triggering. The following fields may be used for triggering a CSP program:

prog_addr: specifies the CSP memory address of the beginning of the CSP program.

Address 10'b0 stands for "no CSP program" initiation. If a previously triggered CSP program exists, it will continue its execution.

prog_delay: specifies the number of cycles to wait from the beginning of the instruction until the CSP program is triggered.

VI. INSTRUCTION

LENGTH (i.e., Duration)

Each instruction lasts for a certain number, C, of cycles. This number can be taken from the instruction itself (e.g., from a length field) or by taking the length field and adding a length_offset value (e.g., stored in a dedicated register, cthe value of which may be calculated by a CSP 410). The decision between these two options is made according to the use_length_offset bit in the instruction. The number of bits used for the length field determines the maximum instruction length (e.g., for $_{30}$bits with a $_4$ ns clock cycle the longest instruction is $_{64}$ ms). There may be a minimum instruction length as well (e.g., 1 clock cycle, 2 clock cycles, 3 clock cycles, 4 clock cycles, or any other determined number of cycles).

There may be three fields involved with determining the length (i.e., duration): of a pulser instruction: length, length_offset_enable, and step_to_grid.

length: specifying the static C length_offset_enable: 1 bit specifying how to calculate C according to the following table

| | |
|---|---|
| length_offset_enable = 0 | Length of the instruction is the value, C, in the length field |
| length_offset_enable = 1 | Length of the instruction is the value, C, stored in the length field plus the value stored in a length_offset register. |

The duration of a pulser instruction may be affected by additional fields such as a break_enable field, a last field, and/or a pause field.

break enable: a bit set in this field indicates that the control circuitry 408 should break out of the current instruction and move to the next instruction (taking into account any branching fields in the pulser instruction) upon receiving a break signal from a CSP 410, pause: a particular bit set in this field indicates the length field is to be ignored and the next instruction is not to be fetched until software sends an indication (e.g., the programming subsystem 202 sets a bit in a register) to continue execution.

In addition, another bit in the instruction, called step_to_grid, will add some more cycles to the instruction in order for it to end on a time_grid_line, (i.e., end on a clock cycle in which time_stamp/time_grid_step is an integer, where time_stamp is the number of (active) cycles since the beginning of the program, and time_grid_ step=2time_grid_step_exp where time_grid_step_exp is a value (e.g., 2) saved in a register such that it can be calibrated and set by the user.

step_to_grid: specifies whether to increase the instruction length until time_stamp/time_grid_step=integer Thus, if step_to_grid d=1, C→C+ΔC, where ΔC is added until time_stamp/time_grid_step is an integer,

FLOW CONTROL

The address of the next instruction is determined according to the following fields and rules:

addr0: specifies a first option for a next instruction address addr1: specifies a second option for a next instruction address branch_method: specifies the branching method according to the following table

| 00: GOTO | if use_jump then<br>    next_addr = addr0+jump<br>else<br>    next_addr = addr0 |
| 01: IF | if flag<br>    next_addr = addr0<br>else<br>    next_addr = addr1 |
| 10: GOSUB | next_addr = addr0<br>push addr1 |
| 11: RETURN | if flag or force_return<br>    next_addr = pop<br>else<br>    next_addr = addr0 |

Additional flow control fields of a pulser instructions include use_jump, force_return, and sync:

use_jump: specifies GOTO addr0 or GOTO addr0+jump force_return: specifies unconditional return NOTE: use_jump and force_return are used only in GOTO and RETURN, when addr1 is irrelevant. Thus, their fields can overlap with addr1.

Sync: 1 bit used to specify instruction type of synchronization

When the Sync bit is asserted, the length of the instruction has no use. Therefore, the lowest 10 bits may be used as an indirect address for retrieving from memory a synchronization bit map. The instruction will send a sync ready indication to other pulsers with which it is to operate synchronously and will only progress to the next instruction (according to the branching type) when all pulsers found in the bit map have also sent a sync ready indication. For instance, if pulsers 0 and 1 both have read a sync instruction with bit map of 0000000011 at a different time point. Both will proceed to the next instruction at the exact same time, only after both have reached the sync time point.

last: a particular value in this field indicates that the current instruction is the last instruction of a pulse program.

STREAMING OUT

There are 22 possible vectors that can send raw data to the quantum programming subsystem 202 for offline analysis.

ADC X 2-Triggered by routing digital pattern to the last two digital delay patterns.

CSP X 10-Triggered by the CSP program.

Sequencer X 10-Triggered via an instruction bit "seq stream enable", or by CSP program.

Seq stream enable: commands to send instruction information including timestamp when the instruction is executed.

Figure 10:
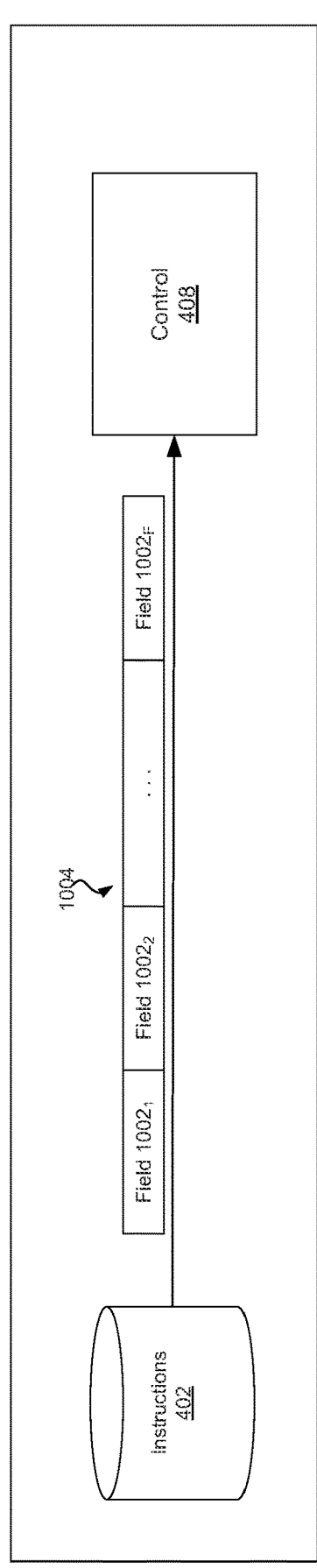
FIG. 10 illustrates loading a pulser instruction into control circuitry of a pulser.

FIG. 10 illustrates loading a pulser instruction into control circuitry of a pulser. The pulse program machine code is stored in instruction memory 402. A sequencer of the control circuitry 408 retrieves the instruction 1004 from the memory 402 and then generates one or more analog pulses and/or one or more digital parses according to the fields $1002_1$-$1002_F$ (F an integer) of the instruction 1004.

In accordance with an example implementation of this disclosure, a system comprises pulse instruction memory (e.g., 402) and pulse generation circuitry (e.g.,302), wherein the pulse generation circuitry is operable to retrieve a pulse instruction (e.g., 1004) from the pulse instruction memory, and concurrently generate one or more analog pulses based on a first one or more fields (e.g., one or more of fields $1002_1$-$1002_F$) present in the pulse instruction, and one or more digital pulses based on a second one or more fields (e.g., one or more of fields $1002_1$-$1002_F$) present in the pulse instruction.

The first one or more fields may include an IQ mode field, and the pulse generation circuitry may be operable to determine, based on the IQ mode field, whether the pulse instruction triggers generation of an independent pulse or a pulse pair.

The first one or more fields may include a pulse method field (e.g., pulse_method) that specifies a method to use for generating the analog pulse, where the method may be one of constant pulse generation method, an arbitrary pulse generation method, a compressed pulse generation method, and a ramp pulse generation method. The ramp pulse generation method may be a method in which amplitude of the one or more analog pulses is dependent on amplitude of one or more previous pulses generated by the pulse generation circuitry.

The first one or more fields may include a transformation field that indicates whether a linear transformation is to be applied to the analog pulse. In response to the transformation field indicating that a linear transformation is to be applied, the pulse generation circuitry is operable to determine a value (e.g., calculate a G matrix or retrieve a G matrix from memory) and multiply the analog pulse with the determined value.

The first one or more fields may include a field (e.g., csf_index) that contains an identifier (e.g., an index of a particular register in an array of registers) of which one of the modification settings circuits $504_0$-$504_{K-1}$ be used for manipulating the phase, frequency, and/or amplitude of the analog pulses.

The first one or more fields may include an analog port field (e.g., analog_port) that specifies via which of a plurality of ports (e.g., 920 and 922) of the pulse generation circuitry the analog pulse should be output.

The first one or more fields may include a field (e.g., prog_addr) that contains the address in memory of a program to be executed by the signal processor during execution of the pulse instruction by the pulse generation circuitry. The pulse generation circuitry is operable to trigger execution of the program by the signal processor, The first one or more fields may include a field (e.g., prog_delay) that specifies a delay period, and the pulse generation circuitry may be operable to trigger the program to begin executing after the delay period.

The first one or more fields may include a first field (e.g., length_offset_enable) that indicates whether a duration of execution of the pulser instruction is predetermined or is to be calculated during execution of the pulser instruction. The pulse generation circuitry may be operable to determine a duration of execution of the pulser instruction based on the first field. When the duration of execution is predetermined, the one or more fields may include a third field (e.g., length) that contains the duration of execution of the pulser instruction. The pulse generation circuitry may be operable to determine a duration of execution of the pulser instruction based on the third field.

The first one or more fields may include a step-to-grid field (e.g., step_to_grid) that specifies whether the duration of execution of the instruction is to be extended until a value of the timestamp register meets one or more criteria (e.g., whether the value stored in the timestamp register divided by a value stored in a grid step register is an integer). The pulse generation circuitry may be operable to execute the pulser instruction until a first, sooner time, when the step-to-grid field contains a first value and until a second, later time when the step-to-grid field contains a second value.

The first one or more fields may include a branch method field (e.g., branch_method). The pulse generation circuitry may be operable to determine which of a plurality of branching methods (e.g., GOTO, IF, GOSUB, RETURN) to use based on the branch method field.

The first one or more fields include a first field (e.g. addr0) containing a first address and a second field (e.g., addr1) containing a second address. The pulse generation circuitry may be operable to determine whether to next execute a first instruction at the first address or a second instruction at the second address based on the branch method field.

The first one or more fields may include a sync field (e.g., sync). The pulse generation circuitry may be operable to send a sync ready indication to one or more other pulsers in response to detecting a particular value in the sync field (e.g., when a 1-bit sync value is asserted).

The first one or more fields include a break enable field (e.g., break_enable). When the break enable field contains a first value (e.g., when a 1-bit break_enable value is asserted), the pulse generation circuitry may be operable to break out of the pulser instruction and proceed to a next instruction upon receiving a break signal during execution of the pulser instruction. The break signal may be generated by a signal processor (e.g., a CSP 410) based on calculations performed during execution of the first instruction (e.g., based on a calculation to determine a current state of a quantum processor).

The first one or more fields may include a pause field (e.g., pause). When the pause field contains a first value (e.g., when a 1-bit pause value is asserted), the pulse generation circuitry may be operable to pause execution of the pulser instruction until a resume indication is received (e.g., until the quantum programming subsystem 202 writes, via a PCIE or other communication bus, a particular value to a resume register stored in memory of the quantum controller 210).

The second one or more fields may include a digital route field (e.g., digital_route) that indicates a destination of the one or more digital pulses. The pulse generation circuitry may be operable to route the one or more digital pulses based on the value of the digital route field (e.g., the digital_route field may determine the value of one or more of $D\_path_0$-$D\_path_{L-1}$ and $D\_port_0$ to $D\_port_{L-1}$).

The second one or more fields may include a digital transformation field (e.g., digital_head). The pulse generation circuitry may be operable to output the contents of the digital pattern field as the first one or more clock cycles of the digital pulse.

The system may comprise one or more registers (e.g., in the modification settings circuits 504) configured to store a value corresponding to a phase of a qubit. The first one or more fields may include a phase reset field (e.g., phase_reset). The pulse generation circuitry may be operable to: reset the value corresponding to the phase of the qubit when the phase reset field contains a particular value; and not reset the value corresponding to the phase of the qubit when the phase reset field does not contain the particular value.

The first one or more fields include a digital to analog converter (DAC) mode field (e.g., mode). The pulse generation circuitry may be operable to control a rate at which samples of the analog pulse are sent to a digital to analog converter based on the DAC mode field.

The first one or more fields may include a conditional pulse field (e.g., conditional_pulse; and the pulse generation circuitry may be operable to: if the conditional pulse field contains a first value, release the one or more analog pulses to a quantum processor without regard to a value calculated by a processor during runtime, but if the conditional pulse field contains a second value, determine whether to release the one or more analog pulses to the quantum processor based on a value calculated by a processor (e.g., CSP 410) during runtime.

The first one or more fields include: a frame enable field (e.g., frame_enable) that indicates whether a frame of reference for a qubit is to be updated; and one or more fields (e.g., frame_sin and frame_cos) that contains a values to use for updating the frame of reference of the qubit, The first one or more fields include: a frame enable field (e.g., frame_enable) that indicates whether a frame of reference for a qubit is to be updated; and one or more fields (e.g., frame_dynamic_enable) that indicates whether a value to use for updating the frame of reference of the qubit is to be generated by a processor during runtime.

The first one or more fields include a correction enable field (e.g., c_update). The pulse generation circuitry may be operable to, in response to a particular value in the correction enable field, update a value used to compensate for imperfections of a transmission line via which the pulse generation circuitry is coupled to a quantum element.

One or more parameters (e.g., frequency, frequency_step, frame, correction matrix, linear transformation, and/or the like) used for the one or more transformations may be calculated by the pulse generation circuitry during execution of the pulse instruction and/or during execution of one or more previous pulser instructions of the currently executing pulse generation program.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure. As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
pulse instruction memory configured to store pulse instructions, the pulse instructions including operations that condition one or more analog pulses on inbound quantum readout signals; and
pulse generation circuitry operable to:
retrieve a pulse instruction from the pulse instruction memory and based on a first one or more fields present in the pulse instruction:
retrieve the one or more analog pulses from a pulse memory;
perform one or more transformations to the one or more analog pulses in response to the inbound quantum readout signals, to dynamically determine one or more of a phase, frequency, amplitude, or timing of outbound control pulses;

output the outbound control pulses to one or more quantum elements through shared pulser circuitry that is dynamically assignable across multiple quantum elements; and
complete a feedback loop between the inbound quantum readout signals and the outbound control pulses within a time less than a coherence time of the one or more quantum elements.

2. The system of claim 1, wherein:
the pulse generation circuitry comprises a plurality of pulse generation circuits;
the pulse instruction memory comprises a plurality of pulse instruction memory circuits, each associated with a respective one of the plurality of pulse generation circuits;
the pulse instruction includes a sync field;
a first of the plurality of pulse generation circuits is operable to:
detect a particular value in the sync field;
send a sync ready indication to one or more others of the plurality of pulse generation circuits in response to the detection of the particular value in the sync field; and
the first of the plurality of pulse generation circuits is operable to wait for a ready indication from the one or more others of the plurality of pulse generation circuits before moving to a next pulse instruction.

3. The system of claim 1, wherein:
the first one or more fields include an IQ mode field; and
the pulse generation circuitry is operable to determine, based on the IQ mode field, whether the pulse instruction triggers generation of an independent pulse or a pulse pair.

4. The system of claim 1, wherein:
the first one or more fields include a pulse method field; and
the pulse generation circuitry is operable to determine, based on the pulse method field, which of one or more pulse generation methods to use for generating the analog pulse, the one or more pulse generation methods selected from:
a constant pulse generation method;
an arbitrary pulse generation method;
a compressed pulse generation method; and
a ramp pulse generation method.

5. The system of claim 4, wherein the ramp pulse generation method is a method in which amplitude of the one or more analog pulses is dependent on amplitude of one or more previous pulses generated by the pulse generation circuitry.

6. The system of claim 1, wherein:
the first one or more fields include a linear transformation field; and
the pulse generation circuitry is operable to determine, based on the linear transformation field, whether to apply a linear transformation to the analog pulse.

7. The system of claim 6, wherein the pulse generation circuitry is operable to, in response to the linear transformation field indicating that a linear transformation is to be applied, multiply the analog pulse with a value.

8. The system of claim 1, wherein:
the first one or more fields include a field that contains an identifier of a value to be used for manipulating phase, frequency, and amplitude of the analog pulse; and
the pulse generation circuitry is operable to:
retrieve the value using the identifier; and
perform the one or more transformations based on the value.

9. The system of claim 1, wherein:

the first one or more fields include a field that contains an identifier of a convolution transformation to be applied to the analog pulse to convolve the analog pulse with a preconfigured convolution pattern; and the pulse generation circuitry is operable to:

retrieve the convolution pattern using the identifier; and perform the one or more transformations using the convolution pattern.

10. The system of claim 1, wherein:

the first one or more fields include a field that contains an identifier of an amplification transformation to be applied to the scale values of the pulse according to a preconfigured table; and the pulse generation circuitry is operable to:

retrieve the table using the identifier; and perform the one or more transformations using the table.

11. The system of claim 1, wherein:

the first one or more fields include an analog port field; and the pulse generation circuitry is operable to output the analog pulse to a port specified in the analog port field.

12. The system of claim 1, further comprising a signal processor, wherein:

the first one or more fields include a field that contains an address in memory of a processor program to be executed by the signal processor during execution of the pulse instruction by the pulse generation circuitry; and the pulse generation circuitry is operable to trigger execution of the processor program by the signal processor.

13. The system of claim 12, wherein:

the first one or more fields include a field that specifies a delay period; and the pulse generation circuitry is operable to trigger the program to begin executing after the delay period.

14. The system of claim 1, wherein one or more parameters used for the one or more transformations are calculated by the pulse generation circuitry during execution of the pulse instruction or execution of one or more previous pulse instructions.

15. The system of claim 1, wherein:

the first one or more fields include a first field that indicates whether a duration of execution of the pulse instruction is predetermined or is to be calculated during execution of the pulse instruction or previous pulse instructions; and the pulse generation circuitry is operable to determine a duration of execution of the pulse instruction based on the first field.

16. The system of claim 15, wherein:

when the duration of execution is predetermined, the first one or more fields include a third field that contains a duration of execution of the pulse instruction; and the pulse generation circuitry is operable to determine a duration of execution of the pulse instruction based on the third field.

17. The system of claim 1, further comprising a timestamp register, wherein:

the first one or more fields include a step-to-grid field that specifies whether the duration of execution of the instruction is to be extended until a value of the timestamp register meets one or more criteria; and the pulse generation circuitry is operable to execute the pulse instruction the step-to-grid field includes a Boolean value, and based on the Boolean value executes the pulse instruction at a first time or at a second time.

18. The system of claim 1, wherein:

the first one or more fields include a branch method field; and the pulse generation circuitry is operable to determine which of a plurality of branching methods to use based on the branch method field.

19. The system of claim 18, wherein:

the first one or more fields include a first field comprising a first address and a second field comprising a second address; and the pulse generation circuitry is operable to determine whether to next execute a first instruction at the first address or a second instruction at the second address based on the branch method field.

20. The system of claim 19, wherein the pulse generation circuitry is operable to:

determine the branch method;

using the determined branch method, branch to the appropriate address (first or second); and when at the appropriate address, determine whether to next execute the first instruction at the first address or a second instruction at the second address during execution of the pulse instruction or during execution of one or more previous pulse instructions.

21. The system of claim 1, wherein:

the first one or more fields include a sync field; and the pulse generation circuitry is operable to send a sync ready indication to one or more other pulsers in response to detecting a particular value in the sync field.

22. The system of claim 1, wherein:

the first one or more fields include a break enable field; and when the break enable field contains a first value, the pulse generation circuitry is operable to break out of the pulse instruction and proceed to a next instruction upon receiving a break signal during execution of the pulse instruction.

23. The system of claim 22, further comprising a signal processor operable to generate the break signal based on calculations performed during execution of the first instruction.

24. The system of claim 1, wherein:

the first one or more fields include a pause field; and when the pause field contains a first value, the pulse generation circuitry is operable to pause execution of the instruction until a resume indication is received.

25. The system of claim 1, wherein:

the pulse instruction includes a second one or more fields; and the pulse generation circuitry is operable to generate one or more digital pulses based on the second one or more fields.

26. The system of claim 25, wherein:

the second one or more fields include a digital route field that indicates a destination of the one or more digital pulses; and the pulse generation circuitry is operable to route the one or more digital pulses to one or more digital output ports based on a value of the digital route field.

27. The system of claim 26, wherein:

the second one or more fields include a digital transformation field; and the pulse generation circuitry is operable to transform the digital pulse based on content of the digital transformation field.

28. The system of claim 27, wherein the transformation of the digital pulse comprises a delay of the digital pulse.

29. The system of claim 27, wherein the transformation of the digital pulse comprises an increase of a duration of the digital pulse.

30. The system of claim 27, wherein the transformation of the digital pulse comprises a convolution of the digital pulse with a preconfigured digital pattern.

31. The system of claim 1, further comprising one or more registers configured to store a value corresponding to a phase of a qubit, wherein:

the first one or more fields include a phase reset field; and the pulse generation circuitry is operable to:

reset the value corresponding to the phase of the qubit when the phase reset field contains a particular value; and not reset the value corresponding to the phase of the qubit when the phase reset field does not contain the particular value.

32. The system of claim 1, wherein:

the first one or more fields include a digital to analog converter (DAC) mode field; and the pulse generation circuitry is operable to control a rate at which samples of the one or more analog pulses are sent to a digital to analog converter based on the DAC mode field.

33. The system of claim 1, further comprising a quantum processor, wherein:

the first one or more fields include a conditional pulse field; and the pulse generation circuitry is operable to:

if the conditional pulse field contains a first value, release the one or more analog pulses to the quantum processor; and if the conditional pulse field contains a second value, determine whether to release the one or more analog pulses to the quantum processor based on a value.

34. The system of claim 1, wherein the first one or more fields include:

a frame enable field that indicates whether a frame of reference for a qubit is to be updated; and one or more fields that contains a value to use for updating the frame of reference of the qubit.

35. The system of claim 1, further comprising a processor, wherein the first one or more fields include:

a frame enable field that indicates whether a frame of reference for a qubit is to be updated; and a field that indicates whether a value to use for updating the frame of reference of the qubit is to be generated by a processor during runtime.

36. The system of claim 1, wherein:

the first one or more fields include a correction enable field; and the pulse generation circuitry is operable to, in response to a value in the correction enable field, compensate for imperfections of a transmission line via which the pulse generation circuitry is coupled to a quantum element.

* * * * *